United States Patent [19]

Hester et al.

[11] Patent Number: 4,903,022

[45] Date of Patent: Feb. 20, 1990

[54] INCREMENT/DECREMENT SAMPLING PHASE SHIFTER

[75] Inventors: Richard K. Hester, Whitewright; Nuboru Shiwaku, Dallas, both of Tex.

[73] Assignee: Texas Instruments Incorporated, Dallas, Tex.

[21] Appl. No.: 130,819

[22] Filed: Dec. 9, 1987

[51] Int. Cl.[4] .............................................. H03M 1/10
[52] U.S. Cl. .................................... 341/110; 341/120; 364/513.5
[58] Field of Search ............................... 341/110, 120; 364/513.5

[56] References Cited

U.S. PATENT DOCUMENTS

| | | | |
|---|---|---|---|
| 4,053,926 | 10/1977 | Lemoine et al. | 341/110 |
| 4,638,451 | 1/1987 | Hester et al. | 364/900 |
| 4,692,738 | 9/1987 | Suzuki | 341/110 |
| 4,772,873 | 9/1988 | Duncan | 341/110 |

Primary Examiner—William M. Shoop, Jr.
Assistant Examiner—Marc S. Hoff
Attorney, Agent, or Firm—B. Peter Barndt; James T. Comfort; Melvin Sharp

[57] ABSTRACT

An analog interface system interfaces with a digital signal processor. The system receives analog signals, digitizes those signals and transmits them to the signal processor upon completion of the conversion. The system directs transmission of digital data from the signal processor to the system, and converts it to analog as the output of the system. The digital signal processor determines whether the sampling rate of the D-to-A and A-to-D converters is correct for the rate at which the data is being received by the respective converters. If not, the DSP sends a number of master clock cycles to the system which then retards or advances the sampling rate of the converter by that number of clock cycles.

5 Claims, 29 Drawing Sheets

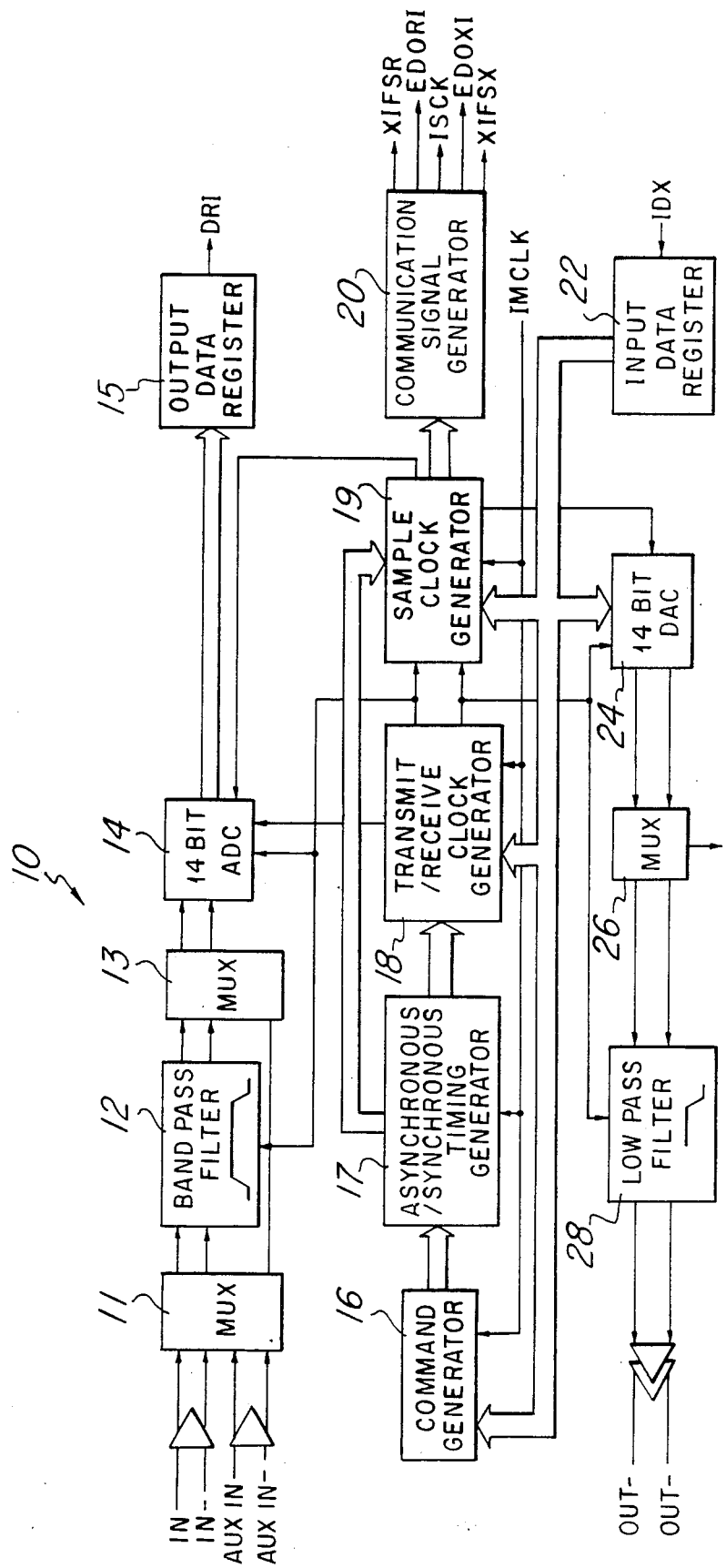

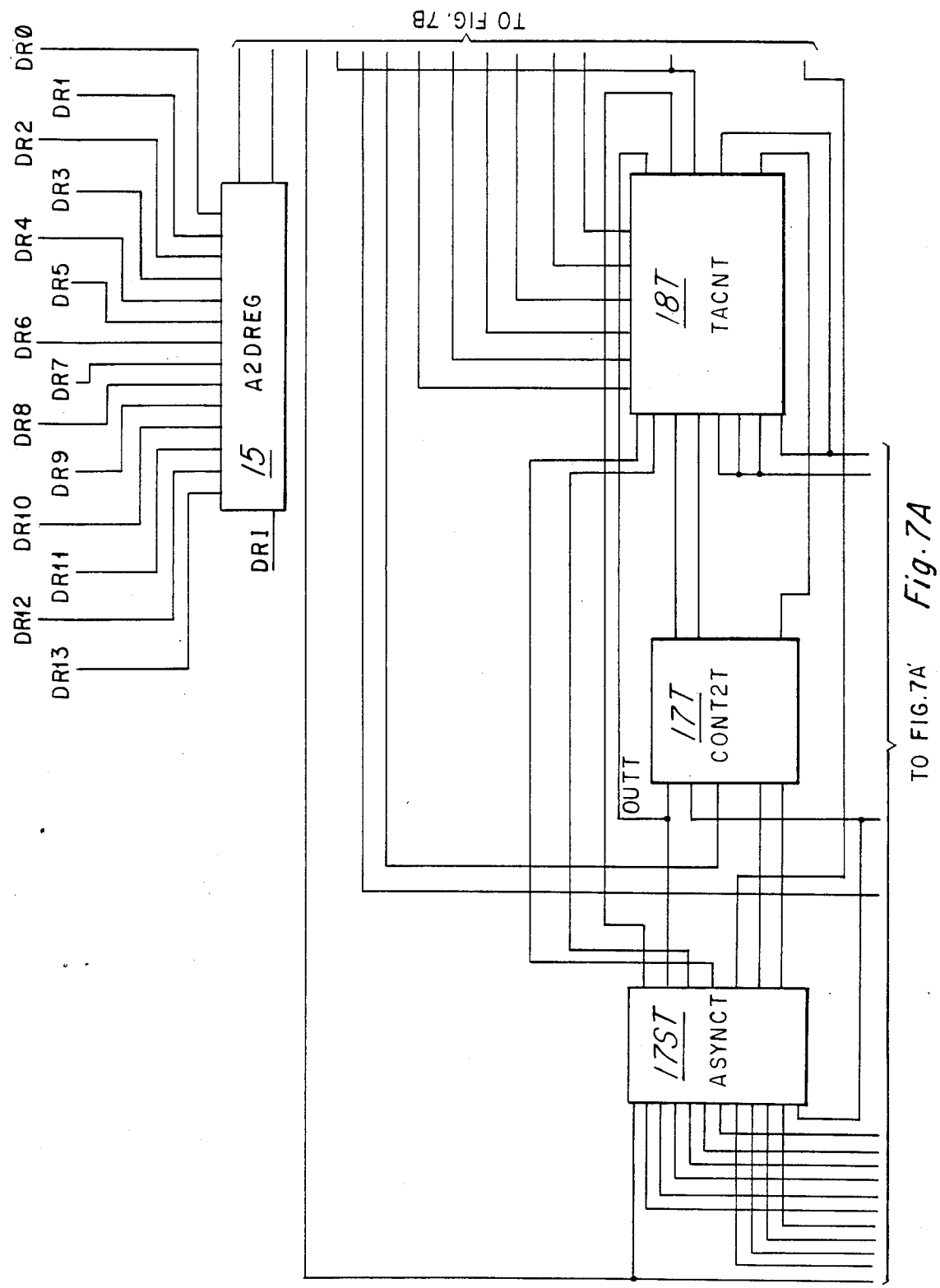

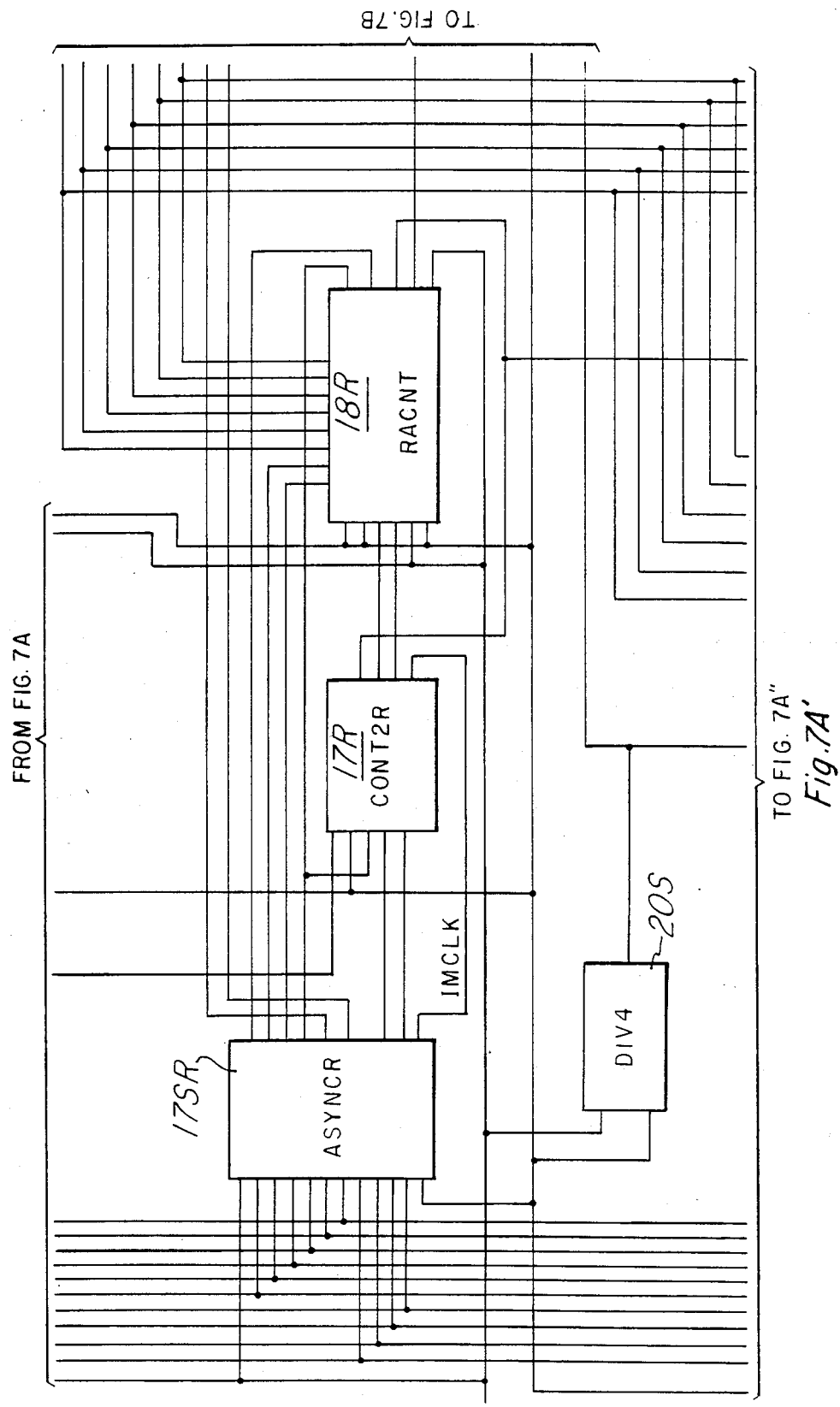

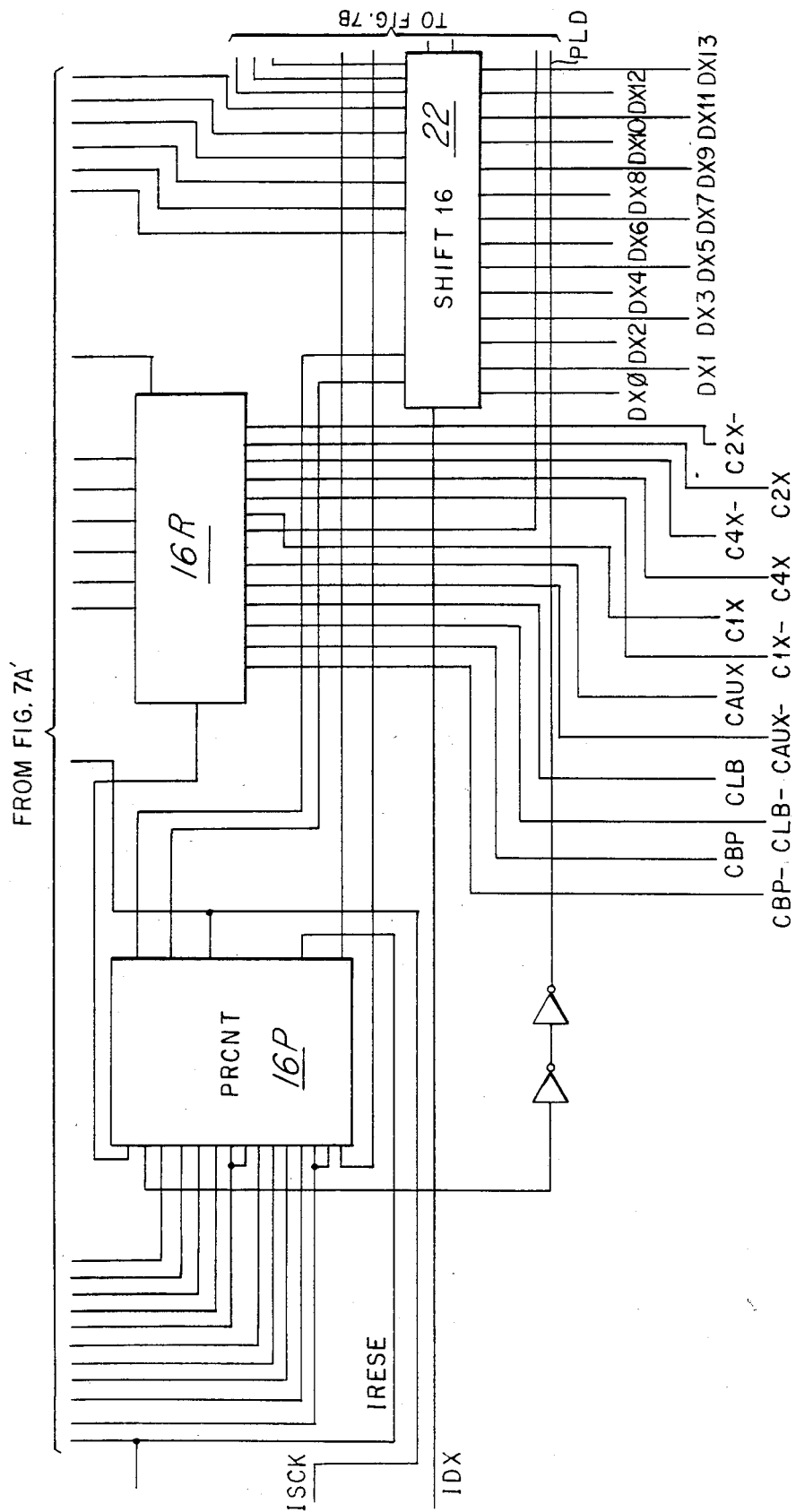
Fig. 7A"

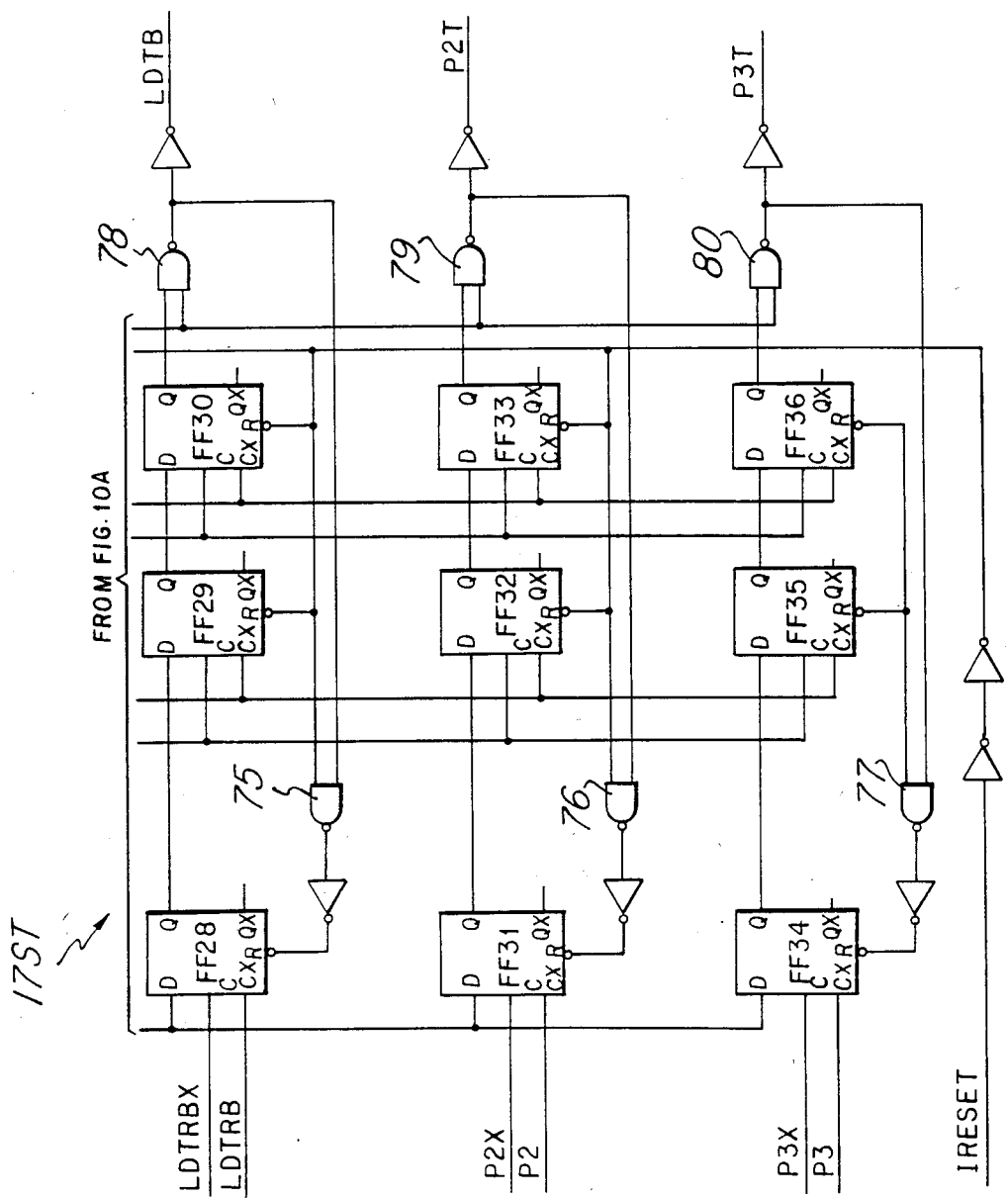

INCREMENT/DECREMENT SAMPLING PHASE SHIFTER

BACKGROUND OF THE INVENTION

1. Field of the Invention

This invention relates to analog interface circuits and more particularly to an analog interface system that has an Analog to Digital (A-to-D) converter for transmitting digital information to digital signal processors and a Digital to Analog (D-to-A) converter for receiving digital information from the digital signal processor (DSP) and converting to analog for outputting, where the analog interface circuit advances or retards the conversion timing by an amount determined by the digital signal processor.

2. Description of the Prior Art

In the past, when an analog interface circuit requires changing of the conversion rates of either the A-to-D converter or the D-to-A converter, the digital signal processor with which the analog interface circuit is associated determines how much the conversion time should be advanced or retarded, and actually implements such a change by generating a correcting pulse that is sent to the analog interface circuit timing. Generally, the extent of such an advance or retardation is plus or minus one master clock cycle.

U.S. Pat. No. 4,638,451—"Microprocessor System with Programmable Interface" issued on Jan. 20, 1987 and assigned to the assignee of this invention involves a microprocessor system that includes an analog input channel and an analog output channel. The analog input channel has an A-to-D converter and the analog output channel has a D-to-A converter. These converters have conversion sampling rates that may be retarded or advanced by one master clock cycle as determined by the associated digital signal processor. After such change, the system goes back to its original conversion rate.

According to the present invention, the digital signal processor simply determines the number of clock cycles (1 to 32 in this preferred embodiment) to be added or subtracted to the conversion timing and transmits that number, upon request to the analog interface circuit. The analog interface circuit then adds or subtracts the number of master clock cycles to the conversion timing to actually implement the change in timing.

By relieving the digital signal processor of its duty to implement such an increment/decrement operation, the present invention enables the digital signal processor to perform other tasks.

BRIEF SUMMARY OF THE INVENTION

In accordance with the preferred embodiment of the invention, an analog interface circuit has an analog input channel and an analog output channel coupled to the data bus of a digital signal processor for interfacing with an environment including analog signals such as speech. The analog input channel has a filter of digitally selectable frequency response coupling an analog signal, such as that received from a microphone, to an A-to-D converter, with a digital output of the converter connected to an output data register. The sampling rate of the A-to-D converter is controllable through the control section of the system which is responsive to data from the signal processor. Likewise, the sampling rate of the D-to-A converter is controllable from the control section, responsive to data from the signal processor.

The digital signal processor through a well known modem technique, detects shifts in the conversion sampling rates that adversely affect the signal-to-noise ratio and determines, in numbers of master clock cycles, the amount of time that the conversion sampling rate should be advanced or retarded to correct the shift. This number is sent through the data channel to the system. The system retards or advances the conversion sampling rate by the number of clock cycles, through its own hardware, thus relieving the digital signal processor of that chore.

The principal object of this invention is to provide an analog interface system that has the capability of retarding or advancing the conversion sampling rate of its A-to-D and/or D-to-A converters.

Another object provides an improved interface system that relieves an associated digital signal processor of time and hardware requirements for advancing or retarding converter sampling rates.

These and other objects will be made apparent in the detailed description that follows.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 1 is a block diagram of the analog interface system.

FIGS. 7A and 7B together form a block diagram of the digital control section of the analog interface system.

FIGS. 10A and 10B joined together form a schematic of the transmit, asynchronous/synchronous timing control.

DETAILED DESCRIPTION OF THE INVENTION

Figure 2A:
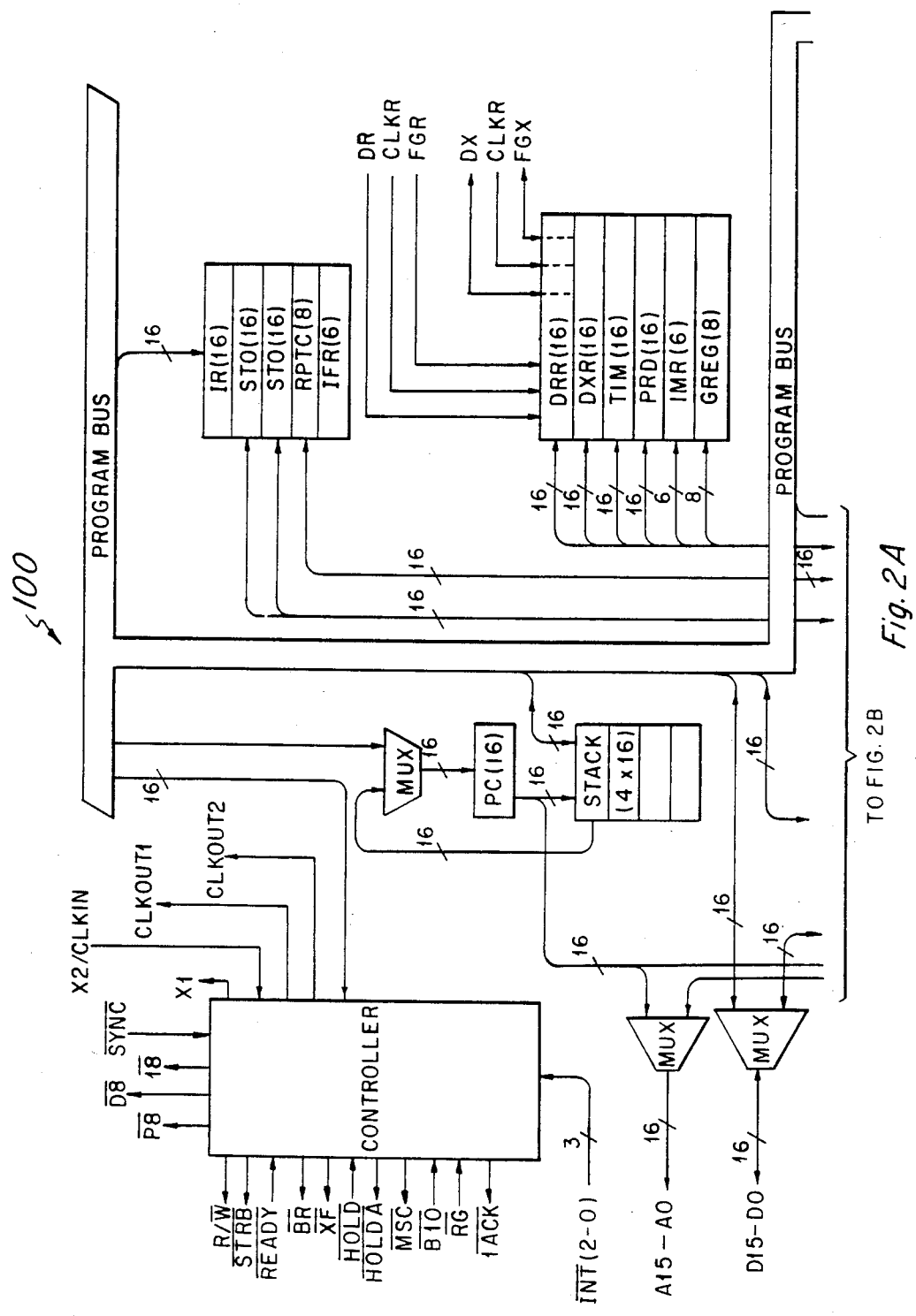
FIGS. 2A and 2B together form a block diagram of the digital signal processor for use with the analog interface system.

The analog interface system to be described herein is primarily used for connection to a digital signal processor, but concepts thereof may be used in interface devices of various configurations, and these devices may be used in many different systems; in one embodiment, the analog interface circuit (AIC) is used in a system in generalized form as shown in FIG. 1. The system may be, for example, a voice communication system, a speech analysis system, a small "personal" or "home" computer with speech capability, an office system with voice message storage and forwarding, a computer terminal having local processing capability with speech output and/or input as well as display and typewriter keyboard, or any one of many applications of such types. The system 10 described herein includes a multiplexer-input buffer circuit 11 for receiving differential input signals IN and IN-, or AUX IN and AUX IN-. These are simply the normal differential inputs for the system or differential auxiliary inputs, as desired. These analog signals are applied to input buffer-multiplexer 11 which connects, in differential fashion, to the input of bandpass filter assembly 12. The differential outputs therefrom are connected to multiplexer 13. The outputs from multiplexer 13 are connected to A-to-D converter 14 whose output is connected to output data register 15. These recited elements make up the analog input circuit. The output signal, DRI, from output data register 15 is transmitted to the data signal processor. In this preferred embodiment, the data signal processor is a Texas Instruments Type TMS 32020. The selection of signal processor, is of course, an engineering choice and the type is given by way of illustration only.

The analog output section starts with input data register 22 which receives digital data signals IDX from the signal processor. The output from register 22 is sent to D-to-A converter 24 whose differential output is sent to sample and hold, and multiplexer 26. The differential output from multiplexer 26 is applied to low pass filter assembly 28, which provides analog output signals OUT+ and OUT−.

The control section is made up of command generator 16 which receives digital data input from input data register 22 and timing in the form of master clock signal IMCLK. The output of command generator 16 is applied to the input of asynchronous-synchronous timing generator 17, which also receives a master clock input. The output from generator 17 is applied to transmit/receive clock generator 18, whose output is applied to the filters 12 and 28 and to converters 14 and 24. The output from generator 18 is also applied to the sample clock generator 19 which also supplies an output to each of converters 14 and 24, as well as an input to communication signal generator 20. Communication signal generator 20 provides output signals XIFSR, EODRI, ISCK, EODXI, and XIFSX that are sent to the signal processor (see FIG. 19).

Figure 2B:
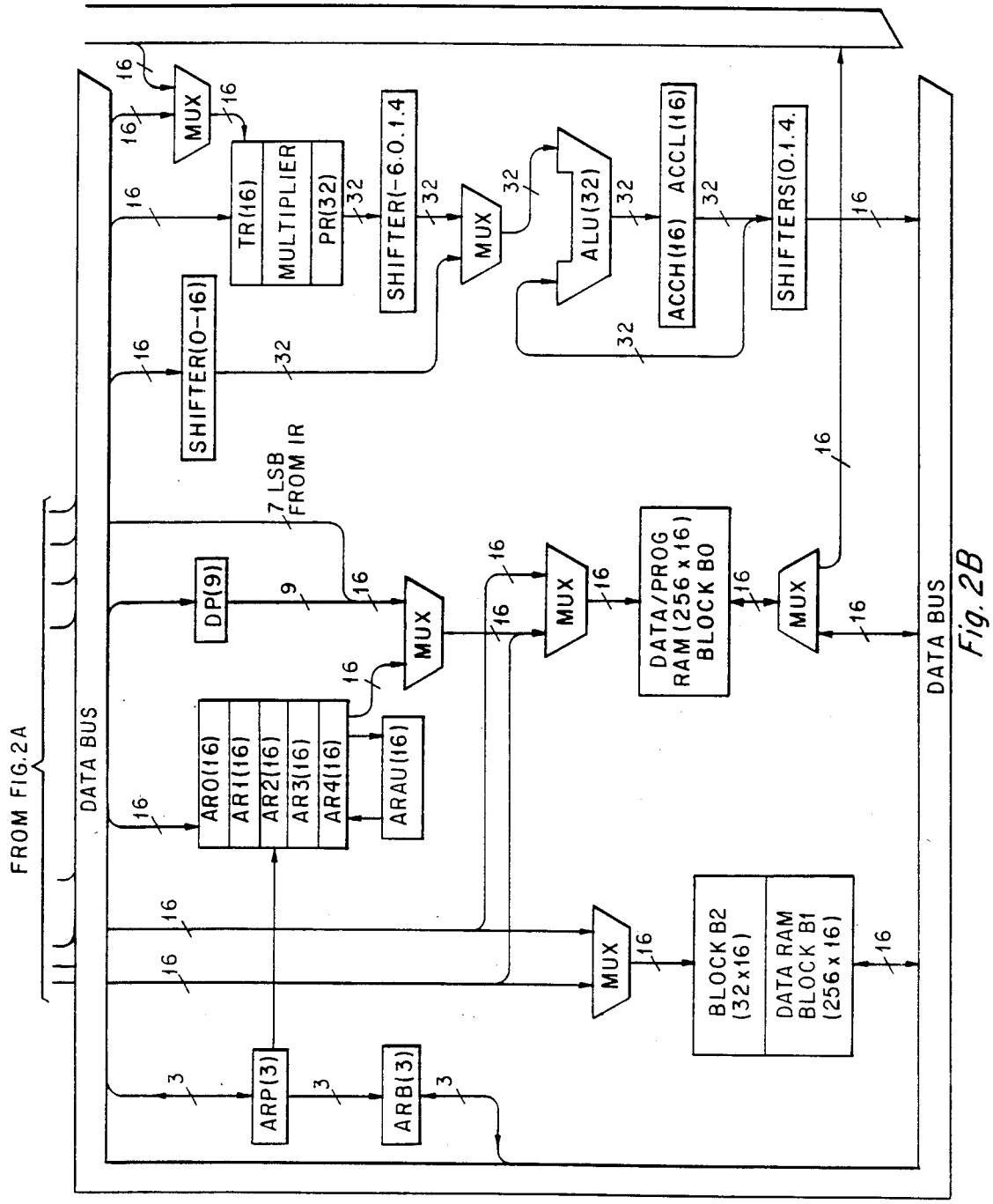

FIGS. 2A and 2B together show a block diagram of the TMS 32020 signal processor, mentioned above, This digital signal processor is well known, is illustrative of a typical signal processor, and therefore no detailed description will be given.

Figure 3A:
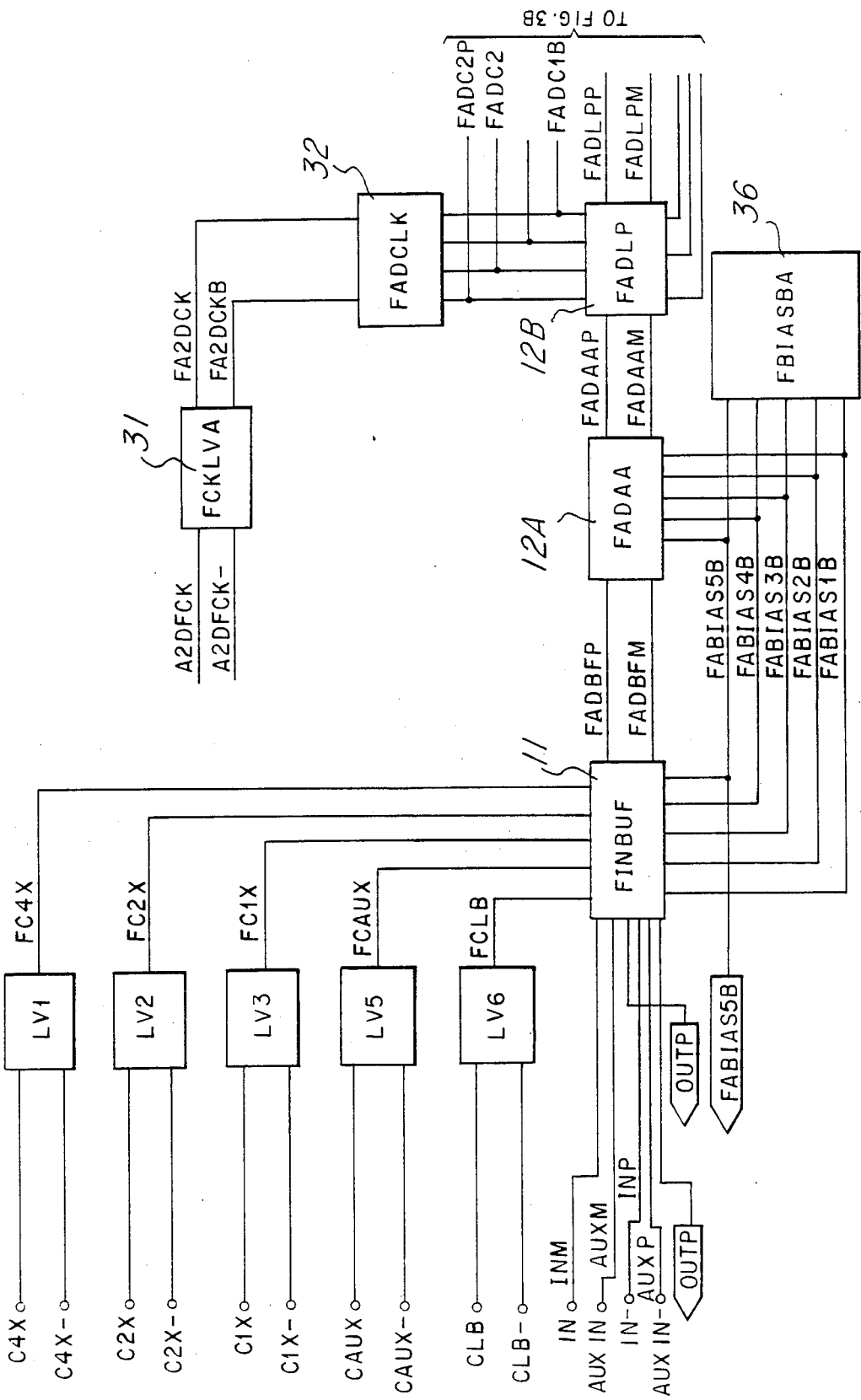
FIGS. 3A and 3B together form a block diagram of the analog input and analog output sections of the analog interface system.
Figure 3A:
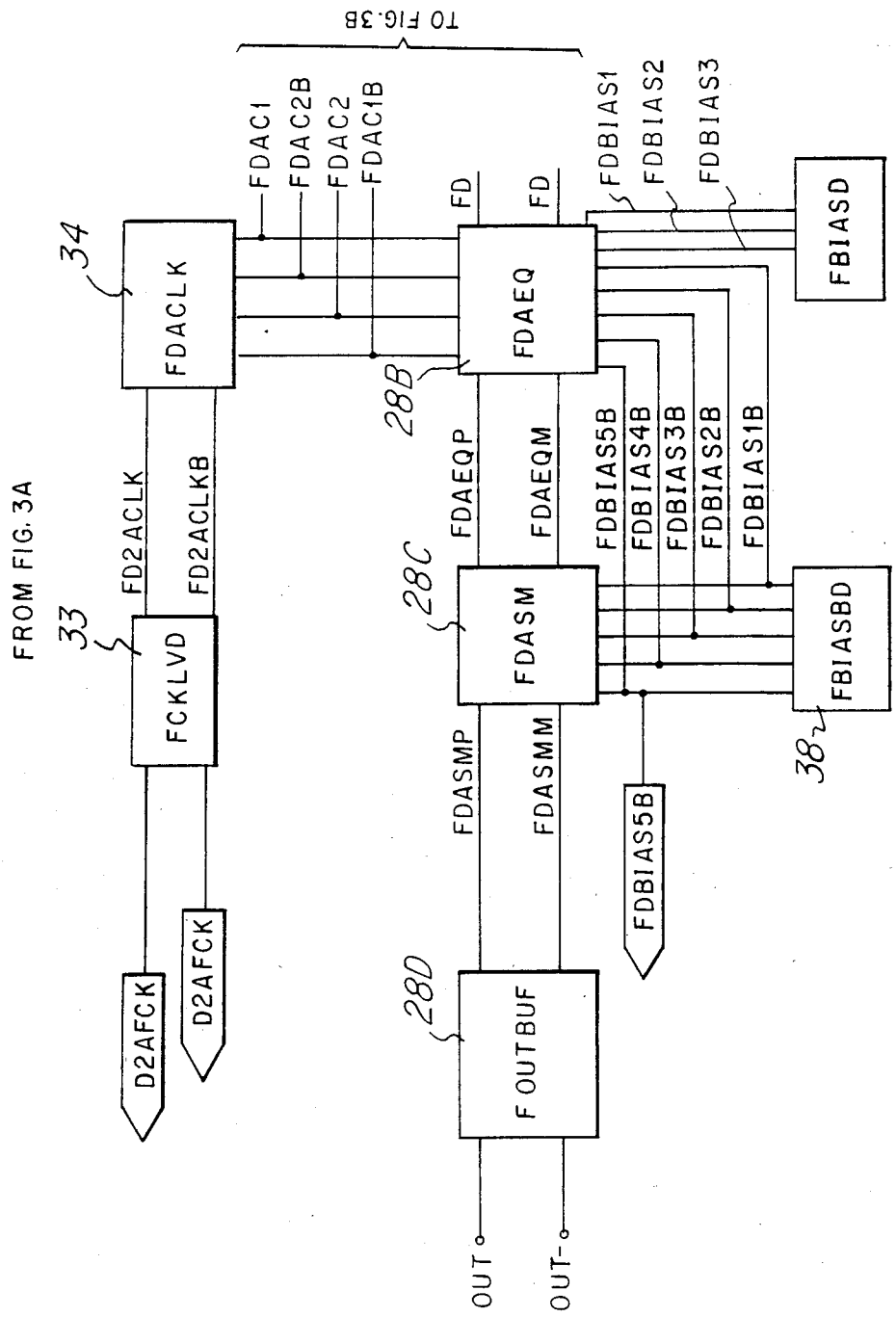
Figure 3B:
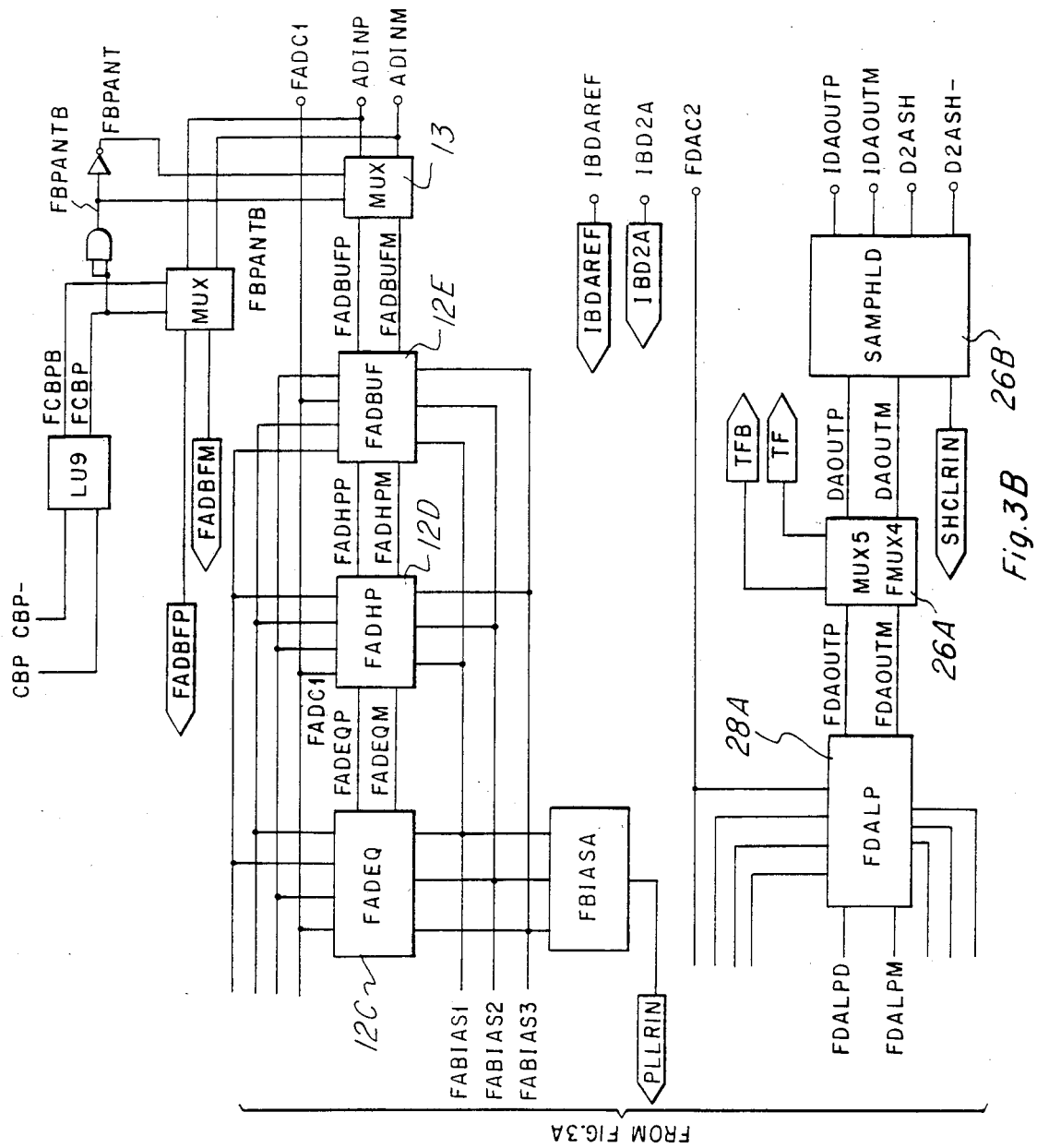

Turning now to FIGS. 3A and 3B, the analog input and analog output channels are shown.

Input buffer/multiplexer 11 is shown with inputs IN, IN-, AUX IN, and AUX IN-, as well as the control signals as shown from control register 16R, shown in FIG. 9. Input buffer 11 is described and claimed in copending U.S. patent application Ser. No. 102,971, filed Sept. 30, 1987, entitled "Precision Switchable Gain Circuit" and assigned to the assignee of this invention. Its differential output is applied to continuous-time, low pass anti-aliasing filter 12A, one section of bandpass filter 12 shown in FIG. 1. The anti-aliasing filter 12A is required to eliminate spectral distortion caused by aliases generated when the signal is sampled by the switched capacitor low pass filter 12B. That is, the switched capacitor low pass filter 12B must not sample signals above half the filter clock rate. The output from input filter 12A provides an input to filter 12B which is a low pass filter. Its output is applied to the input of equalizer 12C. The differential output from equalizer 12C is input to high pass filter 12D. Equalizer 12C and high pass filter 12D are the subject of U.S. patent application Ser. No. 085,054, entitled "Switched Capacitor Filter" filed on Aug. 13, 1987, and assigned to the assignee of this invention. The differential output from high pass filter 12D is applied to the operational amplifier buffer 12E. Sections 12A-12E make up bandpass filter 12 shown in FIG. 1. Low pass filter 12B, equalizer 12C and high pass filter 12D employ switched capacitor technology, in this preferred embodiment, and are well known.

Sample and hold circuit 26B receives signals IDAOUTP and IDAOUTM from digital to analog converter 24 in addition to test inputs DZASH and DZASH-. The output from sample and hold 26B is supplied to multiplexer 26A whose differential output is applied to low pass filter 28A and then to equalizer 28B. The differential output from equalizer 28B provides the inputs to smoothing filter 28C, this filter being identical to filter 12A. The output from filter 28C is applied to the input of output buffer 28D. Sections 28A-28D form the low pass filter 28 of FIG. 1. Equalizer 28B is similar to equalizer 12C. Low pass filter 28A is implemented in switched capacitor technology and is well known.

Figure 4:
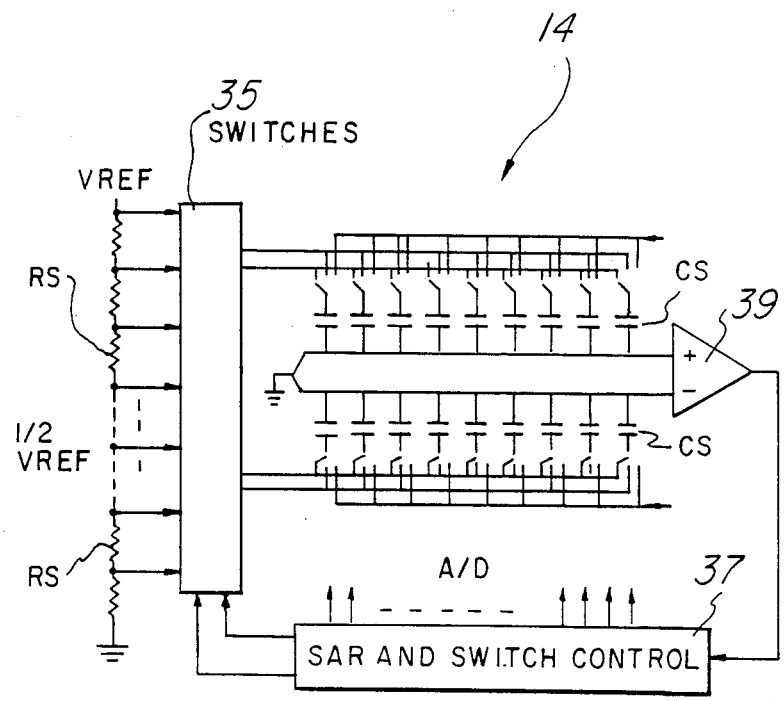
FIG. 4 is a schematic diagram of the analog to digital converter of the system.

FIG. 4 is a schematic diagram of the 14 bit analog to digital converter 14 employed in this system. The 6 bit resistor string RS is used as the primary A-to-D converter, and the 8-bit capacitor array CS is used to interpolate between the taps on the resistor string RS. Comparator 39 receives the differential input from the capacitor string CS and provides an input for Successive Approximation and Switch Control 37. The output from control 37 controls switches 35 which connect to the resistor taps of resistor string RS. A single polarity VREF (three volts in this preferred embodiment) is used to convert the differential input voltage into digital codes. When the comparator 39 resets, one half of the capacitor array CS is switched to VREF while the other half is switched to the input. This sampling procedure divides the input voltage by two, and at the same time, adds one half of VREF to it. When the conversion starts, the sample voltage (one half VREF plus one half VN) is compared to the taps on the upper half of the resistor string RS, while one half VREF plus one half VN- is compared to the lower taps. U.S. patent application Ser. No. 084,277 filed on Aug. 11, 1987, entitled "Charge Redistribution A-to-D Converter with Reduced Small Signal Error" and assigned to the assignee of this invention teaches and claims the technique.

Figure 5:
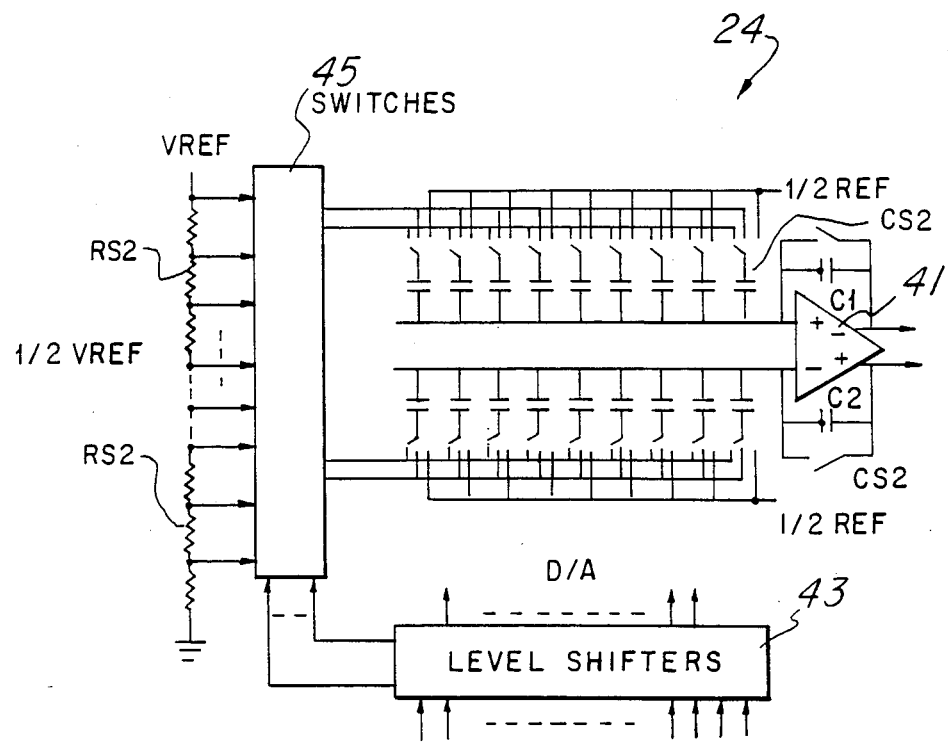
FIG. 5 is a schematic diagram of the digital to analog converter of the system.

FIG. 5 is a schematic diagram of the 14 bit digital to analog converter 24. The digital to analog converter 24 also uses a fully differential resistor string RS2 and capacitor array CS2. During reset, the capacitors of capacitor string CS2 are connected to one half VREF. They are then connected to the proper tap voltages on the resistor string RS2 according to the input code. Input capacitors C1 and C2 are sized at one half of the total array capacitance, giving 12 volt (in this preferred embodiment) peak to peak voltages at the outputs. Level shifters 43 simply provide proper voltage translation from 0–5 volt logic of control circuitry to −5/+5 volt signals for analog switches.

Figure 6:
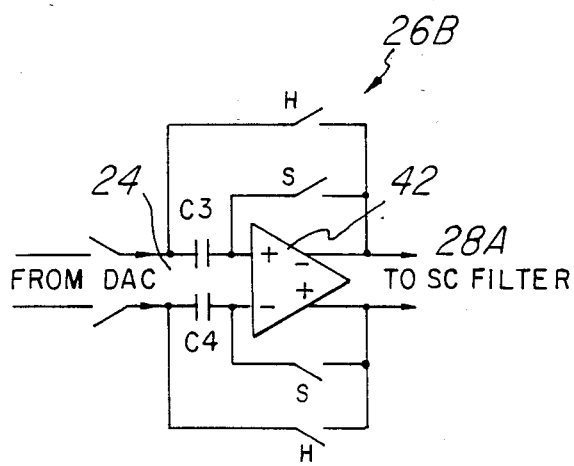
FIG. 6 is a schematic diagram of the sample and hold circuit of the system.

FIG. 6 schematically illustrates sample and hold circuit 26B. This circuit holds the output of converter 24 after each conversion, making the subsequent reset and slew operations of the converter 24 transparent to SC filter 28A. Since this sample and hold circuit 26B comprises only capacitors, it works faster than a traditional RC type of circuit. Operational amplifier 42 is comprised of two single-ended class AB transconductance amplifiers with their positive inputs tied to ground. This composite amplifier 42 has faster slew rate and shorter settling time than standard differential amplifiers. The offset voltage of the amplifier 42 is stored and cancelled by the reset operation.

Figure 7B:
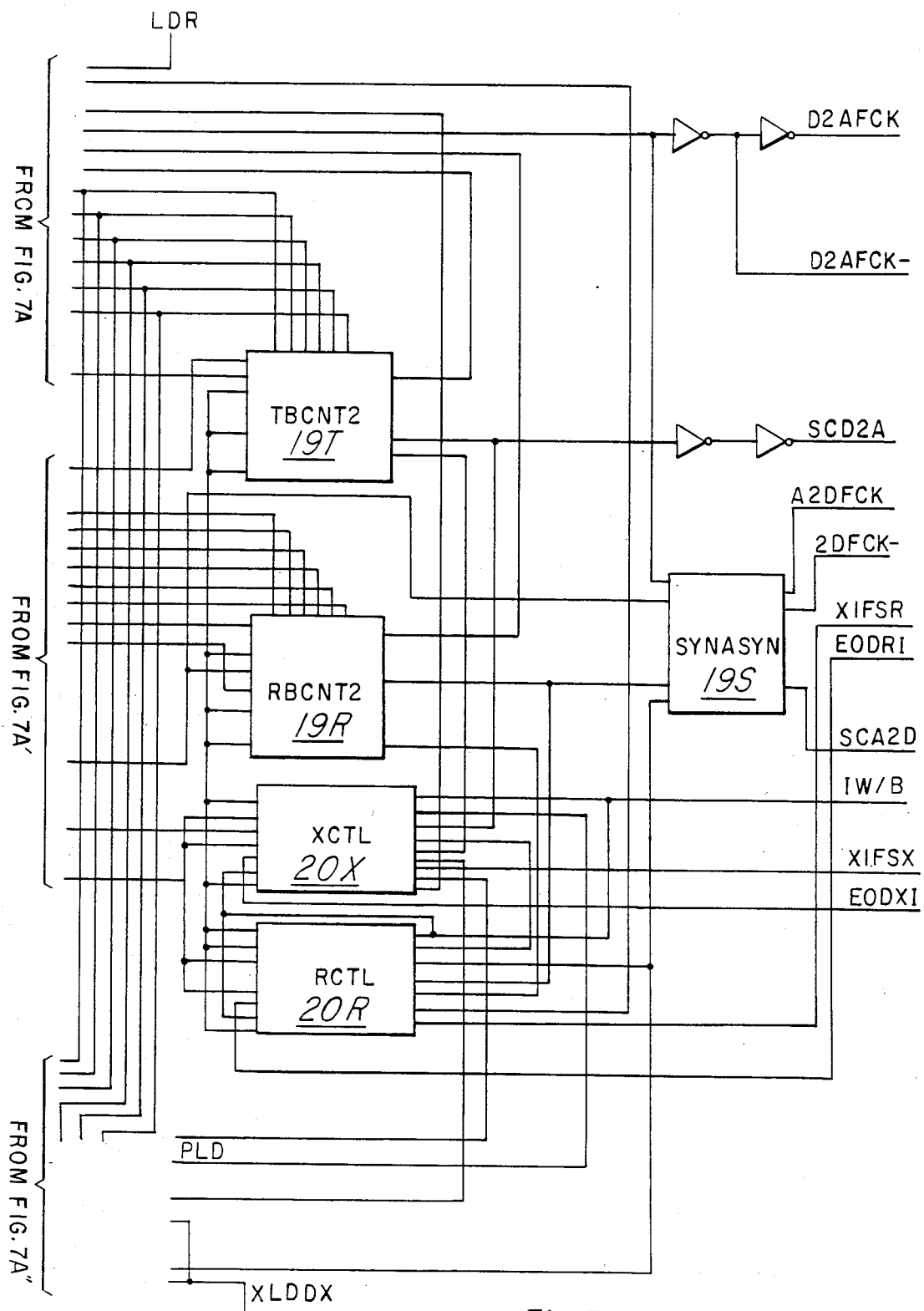

FIG. 7 is a detailed block diagram of the digital control of the AIC system. Controller 16P and control register 16R form command generator 16 shown in FIG. 1. Control register 16R receives digital inputs D2–D7 from input data register 22, and provides control output signals as shown, which are applied to the input buffer 11 of FIG. 3A. The outputs from controller 16P are applied as shown to transmit asynchronous timing control 17ST and receive asynchronous timing control 17SR. The outputs from transmit control 17ST provides inputs to the transmit timing control section 17T and also to TA counter 18T. The outputs from receive control 17SR are applied to receive timing control section 17R and also to TB counter 18R.

Output data register 15 is shown having inputs DR0–DR13 from A-to-D converter 14 and having serial output DRI. TB counter 19T and RB counter 19R are connected as shown and provide conversion frequencies for the D to A converter 24 and the A to D converter 14, respectively. X controller 20X, R controller 20R and divide by four unit 20S form communication signal generator 20, shown in FIG. 1 with the outputs as shown.

Figure 8A:
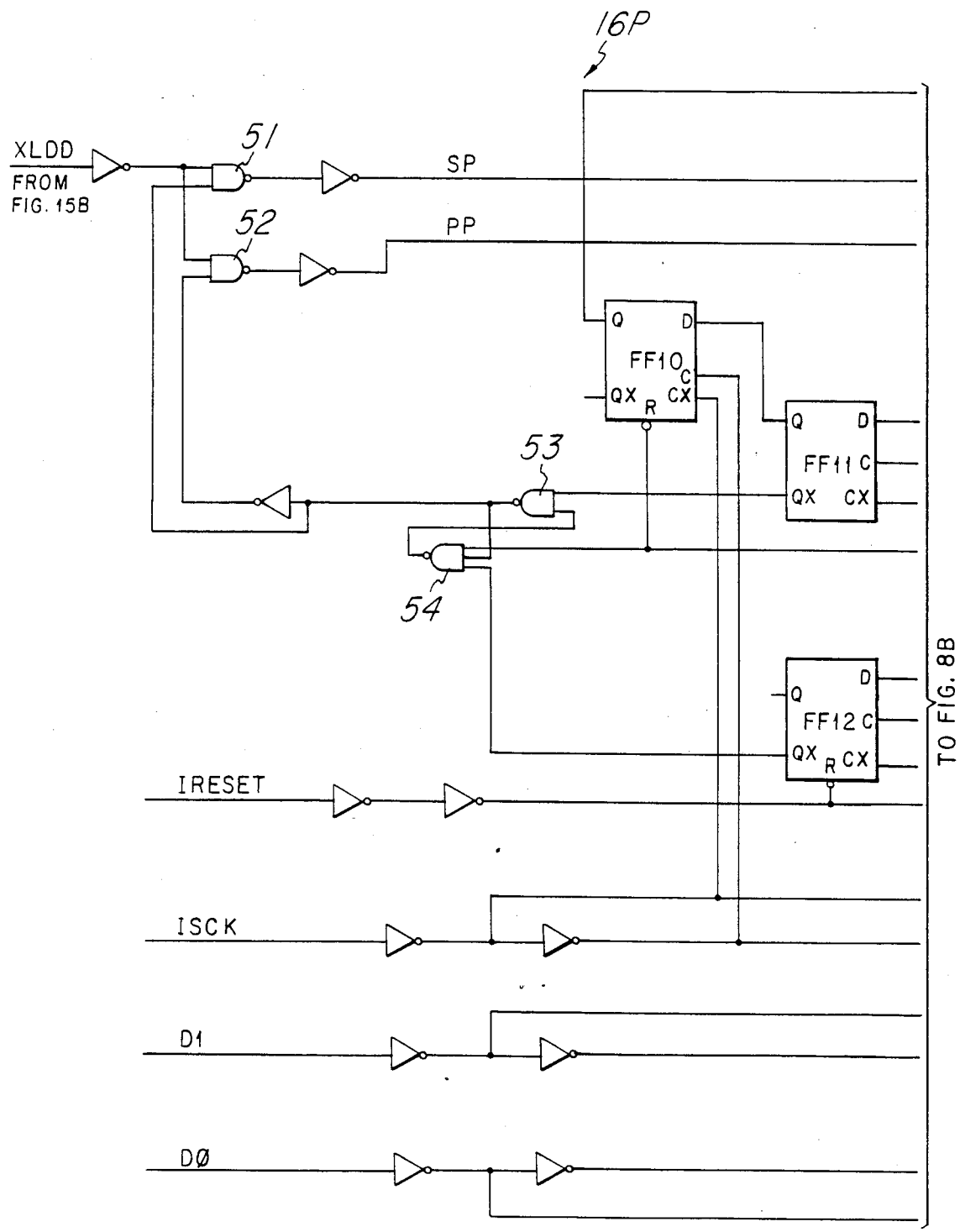
FIGS. 8A and 8B together schematically illustrate one section of the command generator of the control section.
Figure 8B:
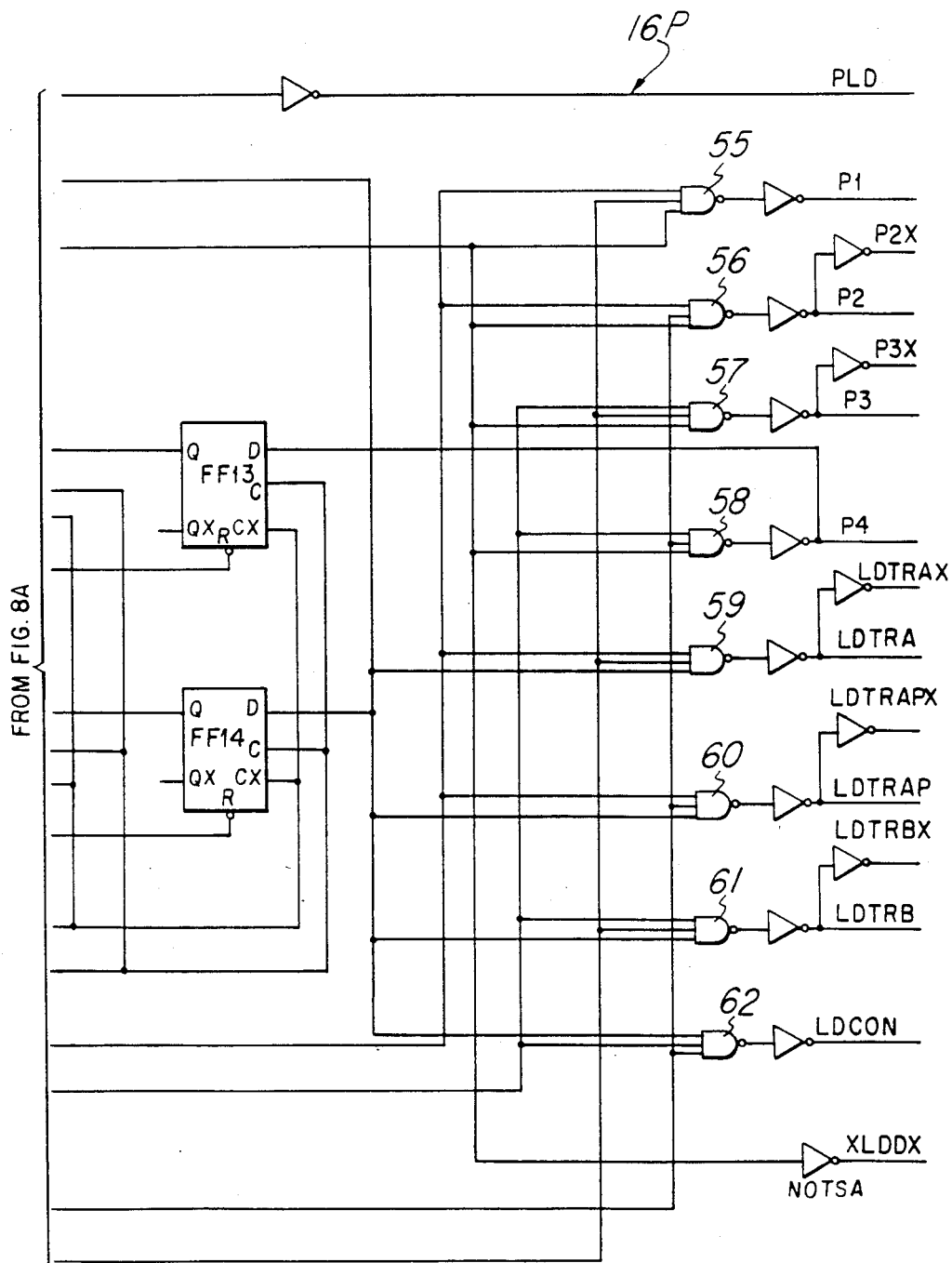
Figure 15A:
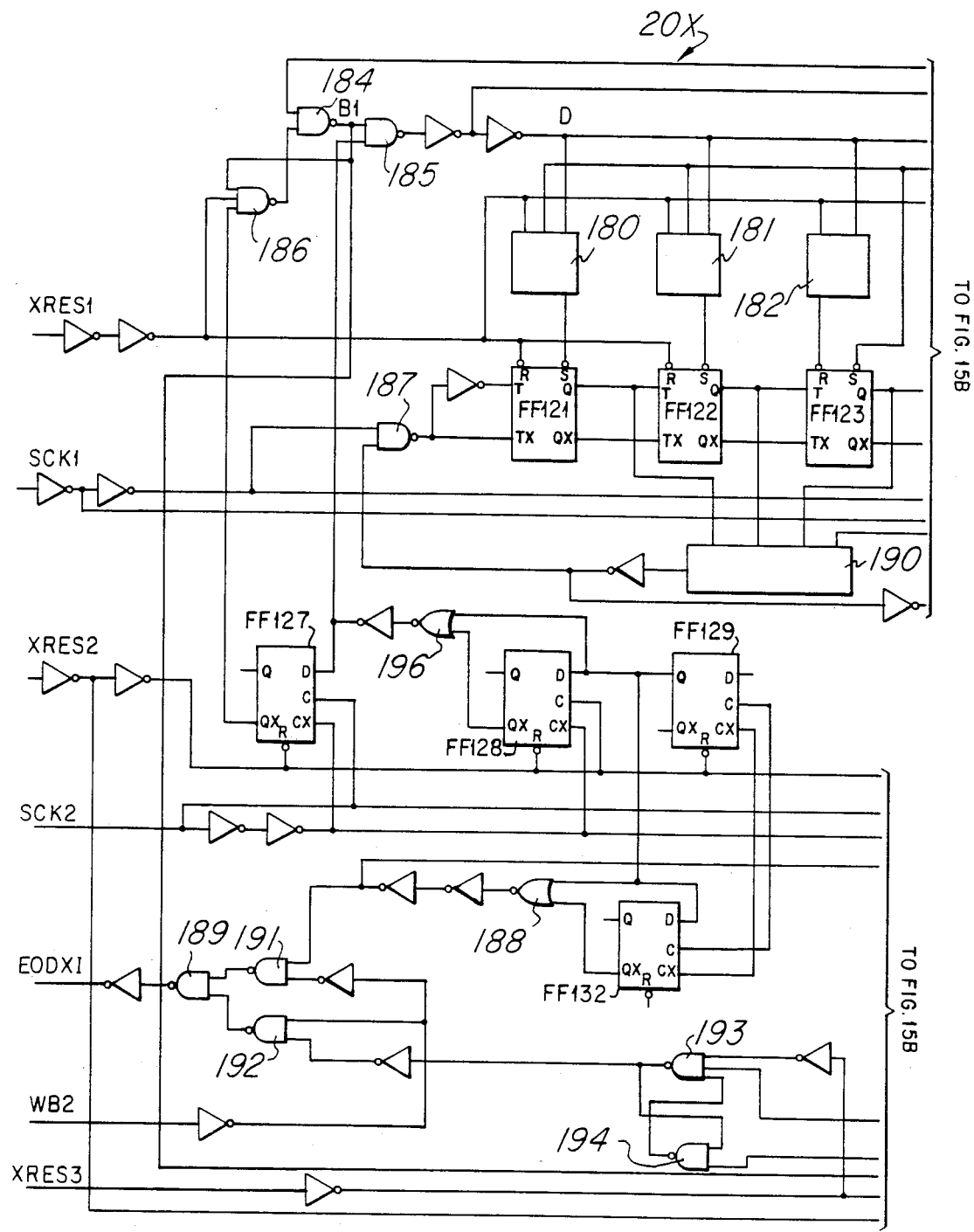
FIGS. 15A and 15B are a schematic diagram of the transmit control section.
Figure 15B:
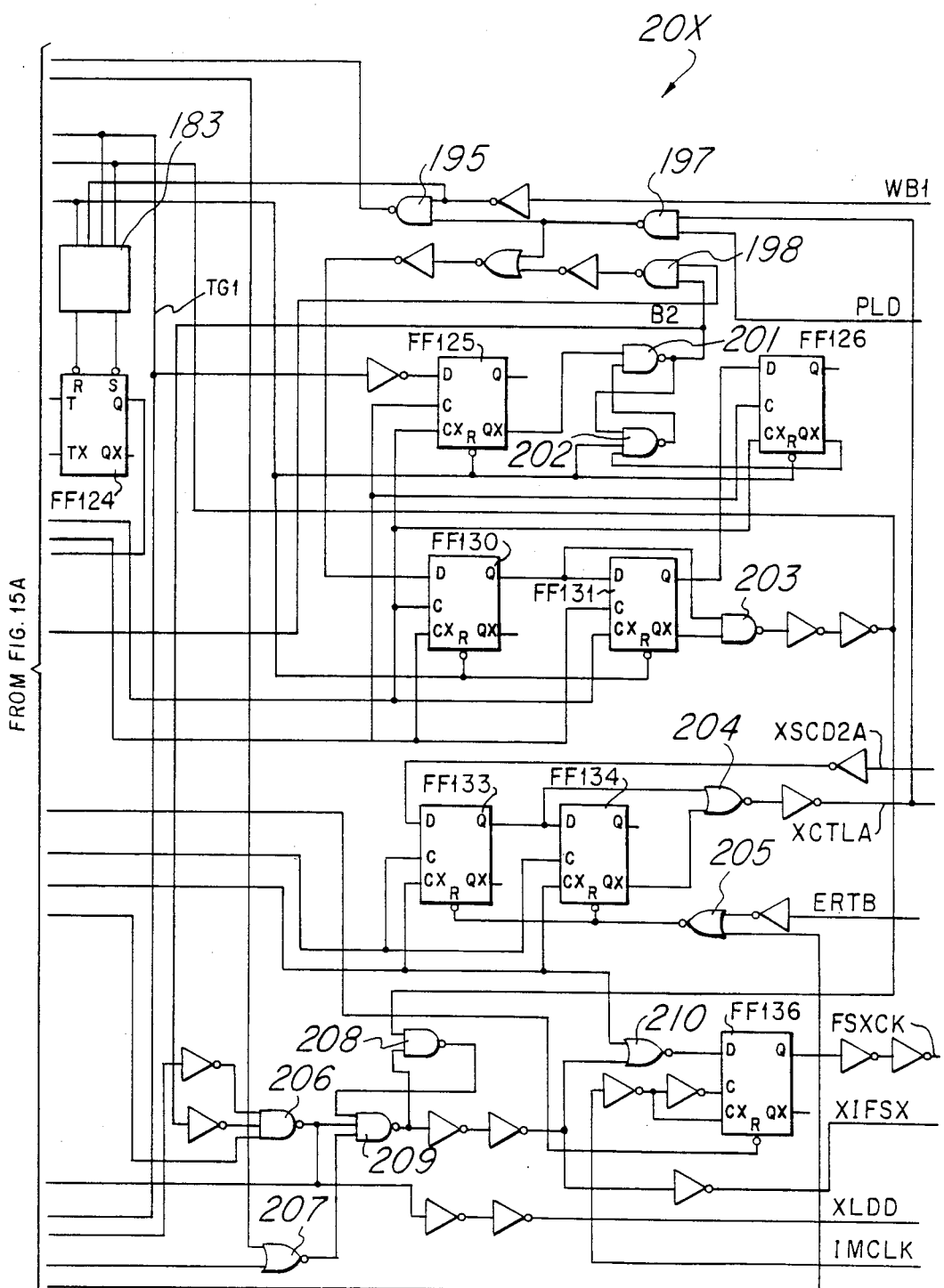

FIGS. 8A and 8B form a schematic of the controller 16P shown in FIG. 7A. Input signal XLDD, from the transmit control shown in FIGS. 15A and 15B is inverted and is applied to the inputs of NAND gates 51 and 52, respectively. NAND gate 53 provides an input to NAND gate 51 and inverted, provides an input to NAND gate 52. The inverted outputs of NAND gates 51 and 52 provide output signals SP and PP. Signal SP provides a D input to flip flop 14 and also provides inputs to NAND gates 59–62. Signal PP provides an input to each of NAND gates 55–58 and is inverted, providing output signal XLDDX.

Clock signal ISCK, the master clock divided by four by divider 20S as shown in FIG. 7A (shift clock) is shown clocking flip flops FF10–FF14 inverted once and inverted twice, as shown.

Signals D0 and D1 from input data register 22 are input to controller 16P. D0 is inverted and applied to the inputs of NAND gates 55, 57, 59 and 61. Signal D0 is again inverted and applied to the inputs of NAND gates 56, 58, 60 and 62. Signal D1 is inverted and applied to the inputs of NAND gates 55, 56, 59 and 60. Signal D1 is again inverted and applied to the inputs of NAND gates 57, 58, 61 and 62. The outputs from NAND gates 55–62 are inverted to provide output signals P1–P4, LDTRA, LDTRAP, LDTRB, and LDCON. Signals P2 and P3 are inverted and shown as output signals P2X and P3X. Other inverted output signals as shown are signals LDTRAPX and LDTRBX.

Signal P4 provides the D input to flip flop 13. Signal ISCK provides the C input to flip flops FF10–FF14 while signal ISCK- provides the CX input to those flip flops. The Q output from flip flop FF13 provides the D input to flip flop FF11 whose Q output provides the D input to flip flop FF10. The Q output from flip flop FF14 provides the D input to flip flop FF12 whose QX output provides an input to NAND gate 54. Another input to NAND gate 54 is provided by the output from NAND gate 53 whose other input is provided by output QX from flip flop FF11. Gates 55–58 yield signals that are logically D0-.D0-, D0.D1-, D0-.D1 and D0.D1, respectively, gated by signal PP. Likewise, gates 59–62 yield the same logic results, gated by signal SP. As will be described later, this function is very important for defining certain operations.

Figure 9A:
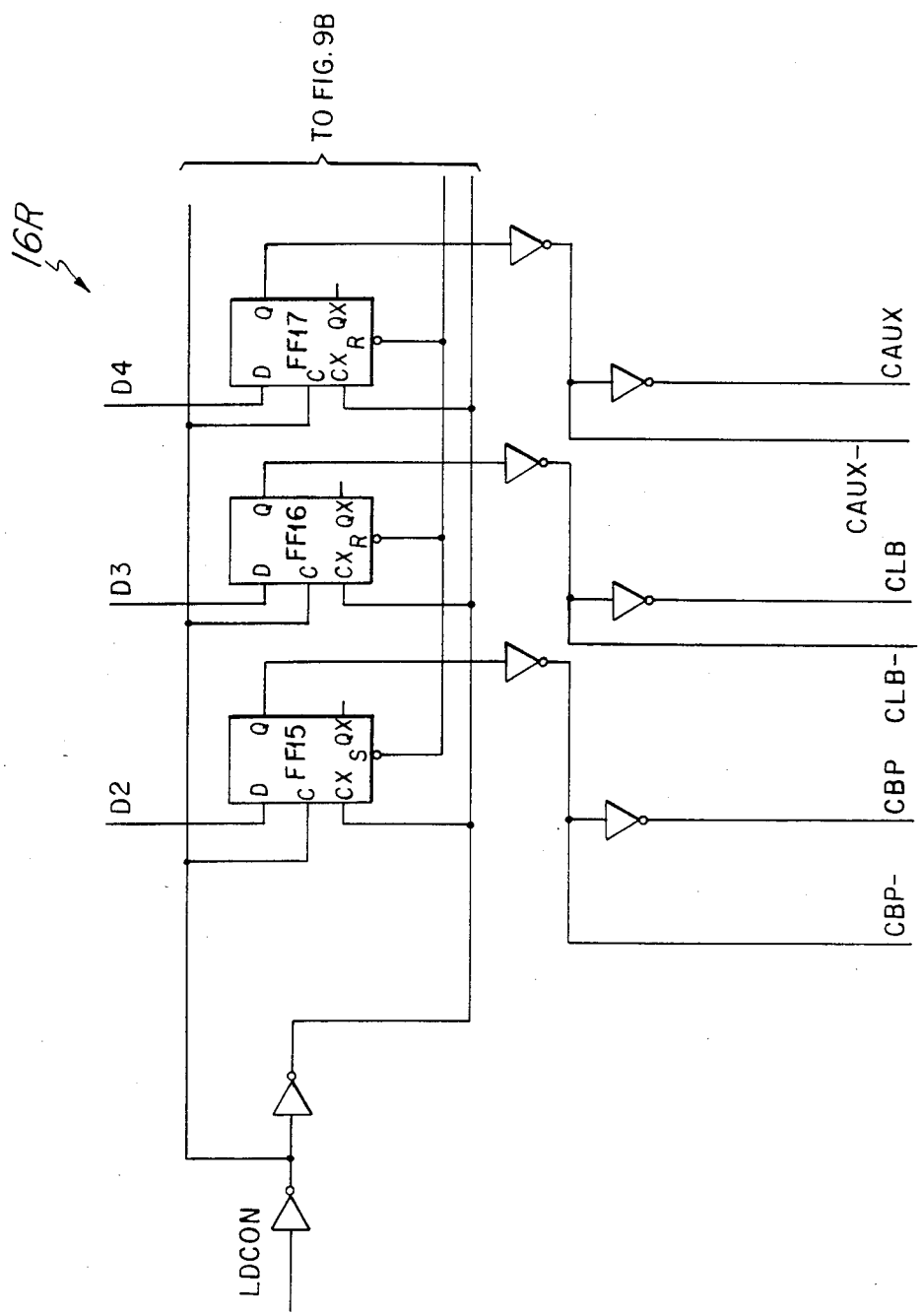
FIGS. 9A and 9B together form the control register section of the command generator.
Figure 9B:
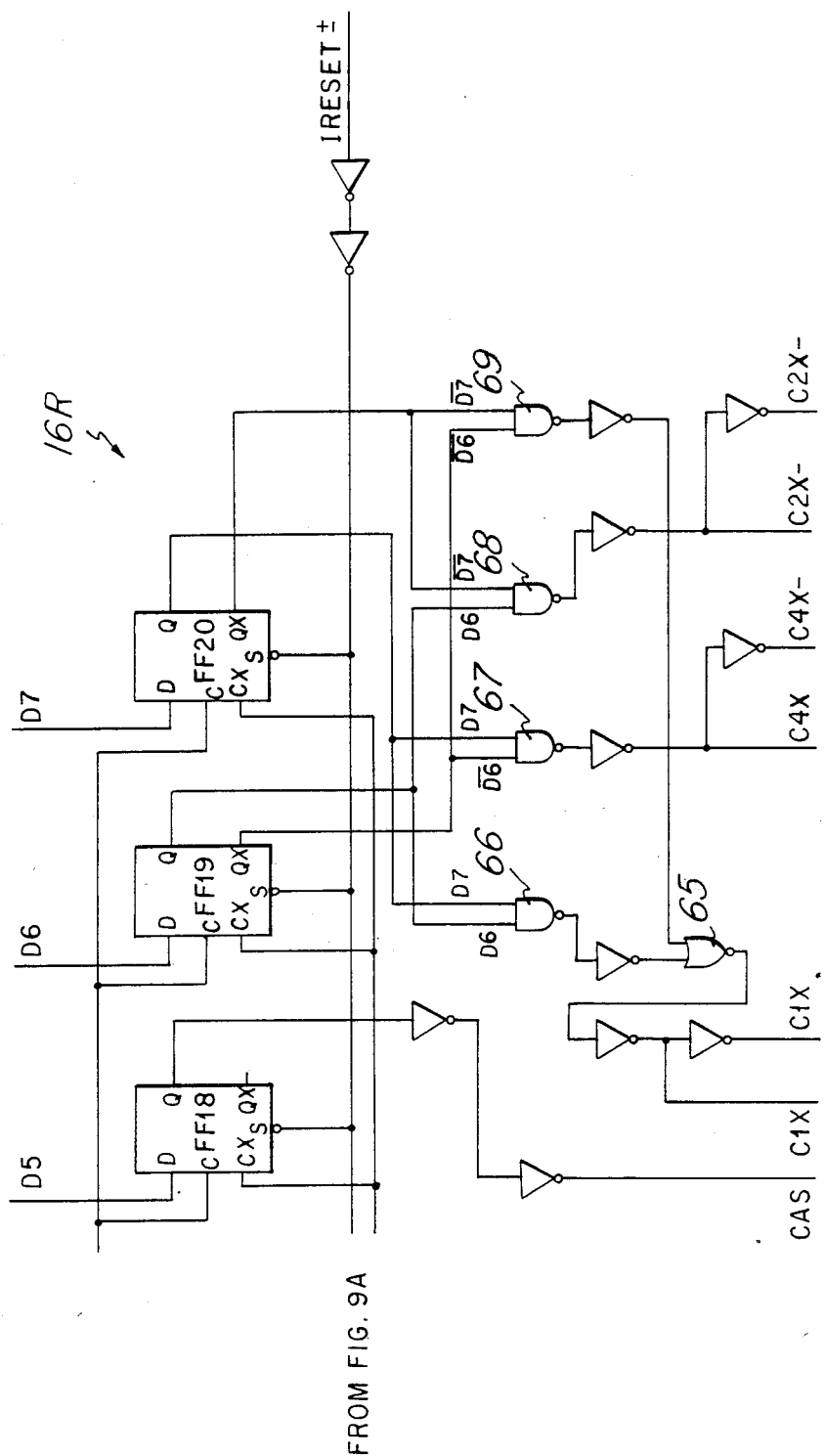

FIGS. 9A and 9B schematically illustrate control register 16R which is made up of flip flops FF15–FF20 for receiving, on their respective D inputs, signals D2–D7 from input data register 22. LDCON, the inverted output from AND gate 62 is inverted and applied to the C input of each of flip flops FF15–FF20. Signal LDCON is again inverted and applied to the CK input of each of flip flops FF15–FF20. The Q outputs of flip flops FF15–FF17 provide differential outputs CBP and CBP-, CLB and CLB-and CAUX and CAUX-, respectively, all of which are applied to the analog input section as shown in FIG. 3A. The Q output of flip flop FF18 provides control asynchronous signal CAS that is applied to the circuit SYNASYN of FIG. 17 for determination of the converter sampling rate. Signals CBP and CBP- is for bypassing filter 12; signal CLB and CLB- are for diagnostic loop block; signals CAUX and CAUX- are auxiliary signals. The Q output from flip flop FF19 provides an input to each of NAND gates 66 and 68. The QX output flip flop FF19 provides an input to NAND gate 67 and NAND gate 69. The Q output of flip flop FF20 provides an input to each of NAND gates 66 and 67. Its QX output provides an input to each of NAND gates 68 and 69. NAND gates 66–69 therefore provide the logic combinations D6.D7, D6-.D7, D6.D7-, D6-.D7-. As will be discussed later, these combinations are very important to the working of the system.

The output from NAND gate 66 is inverted and applied as one input to NOR gate 65 whose other input is the inverted output from NAND gate 69, providing output signals CIX, and inverted, CIX-. The output of NAND gate 67 provides differential signals C4X and C4X-. The output from NAND gate 68 provides differential signals C2X and C2X-. All of these output signals shown in FIGS. 9A and 9B are applied as control signals as shown in FIG. 3A. These signals regulate the gain control of filter 12.

Figure 10A:
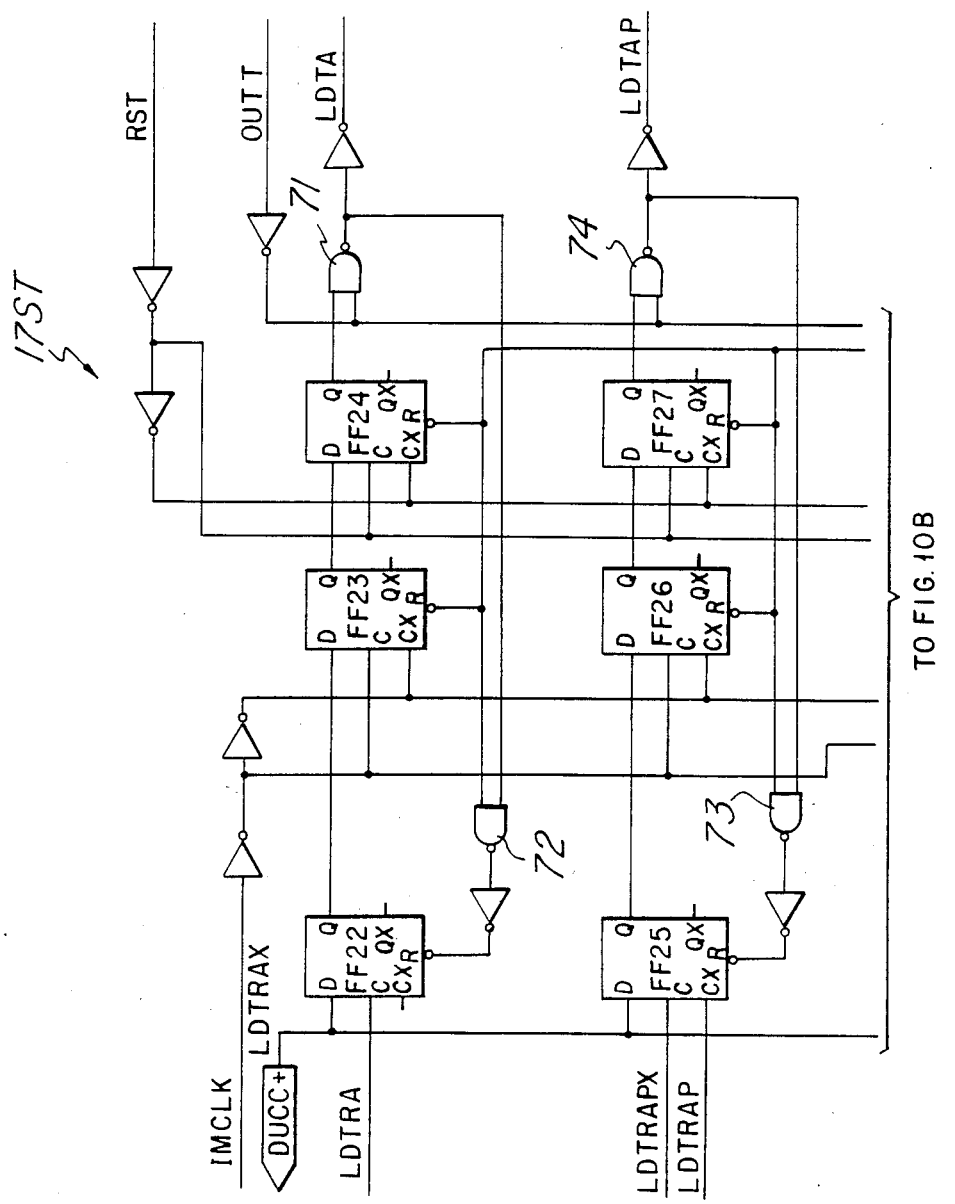

FIGS. 10A and 10B form a schematic diagram of the synchronous-asynchronous control 17ST of the transmit section of the system. Master clock IMCLK is inverted and applied to the C input of flip flops FF23, FF26, FF29, FF32 and FF35. Signal IMCLK is inverted again and applied to the CX input of those same flip flops.

Signal RST from TA counter 18T is inverted and applied to the C input to flip flops FF24, FF27, FF30, FF33 and FF36. Signal RST, inverted still once more is applied to the CX inputs of those named flip flops. Differential inputs LDTRA and LDTRAX, the inverted outputs of NOR gates 59 and 58, respectively, shown in FIG. 8B, are applied to the CX and C inputs, respectively, of flip flop FF22. Differential signals LDTRAP and LDTRAPX, the inverted outputs of NAND gates 60 and 59, respectively, of FIG. 8B, are applied to inputs CX and C, respectively, of flip flop FF25.

Differential signals LDTRBX and LDTRB, the second and first inversions, respectively, from the output of NAND gate 61 are applied to the D and CX terminals, respectively, of flip flop FF28. Differential inputs P2X and P2, the second and first inversions of the output from NAND gate 56 are connected to the C and CX terminals, respectively, of flip flop FF31.

Signals P3X and P3, the second and first inversions of the output from NAND gate 57 are applied to the C and CX input, respectively, of flip flop FF34.

The Q output of flip flop FF22 provides the D input to flip flop 23 whose Q output, in turn, provdes the D input to flip flop FF24. The Q output of flip flop FF24 provides one input to NAND gate 71 whose other input is provided by signal OUTT, (from TA counter 18T, FIG. 13B), inverted. The output of NAND gate 71 provides one input to NAND gate 72, and inverted, provides output signal LDTA. The other inputs to NAND gate 72 is provided by reset signal IRESET, twice inverted. The output of NAND gate 72, inverted, is connected to the R terminal of flip flop FF22. NAND gate 74 provides one input to NAND gate 73 whose other input is provided by signal IRESET, twice inverted. The output of NAND gate 73, inverted, is connected to the R terminal of flip flop FF25. The output of NAND gate 74, inverted, provides output signal LTDAP. NAND gates 78, 79 and 80, inverted, provided output signals LDTB, P2T and P3T, respectively. NAND gates 78-80 also each provide one input to each of NAND gates 75-77, the other input being provided by signal IRESET, twice inverted. The outputs of NAND gates 75-77 are each inverted and applied to the R terminal, respectively, of each of flip flops FF28, FF31 and FF34.

Figure 11A:
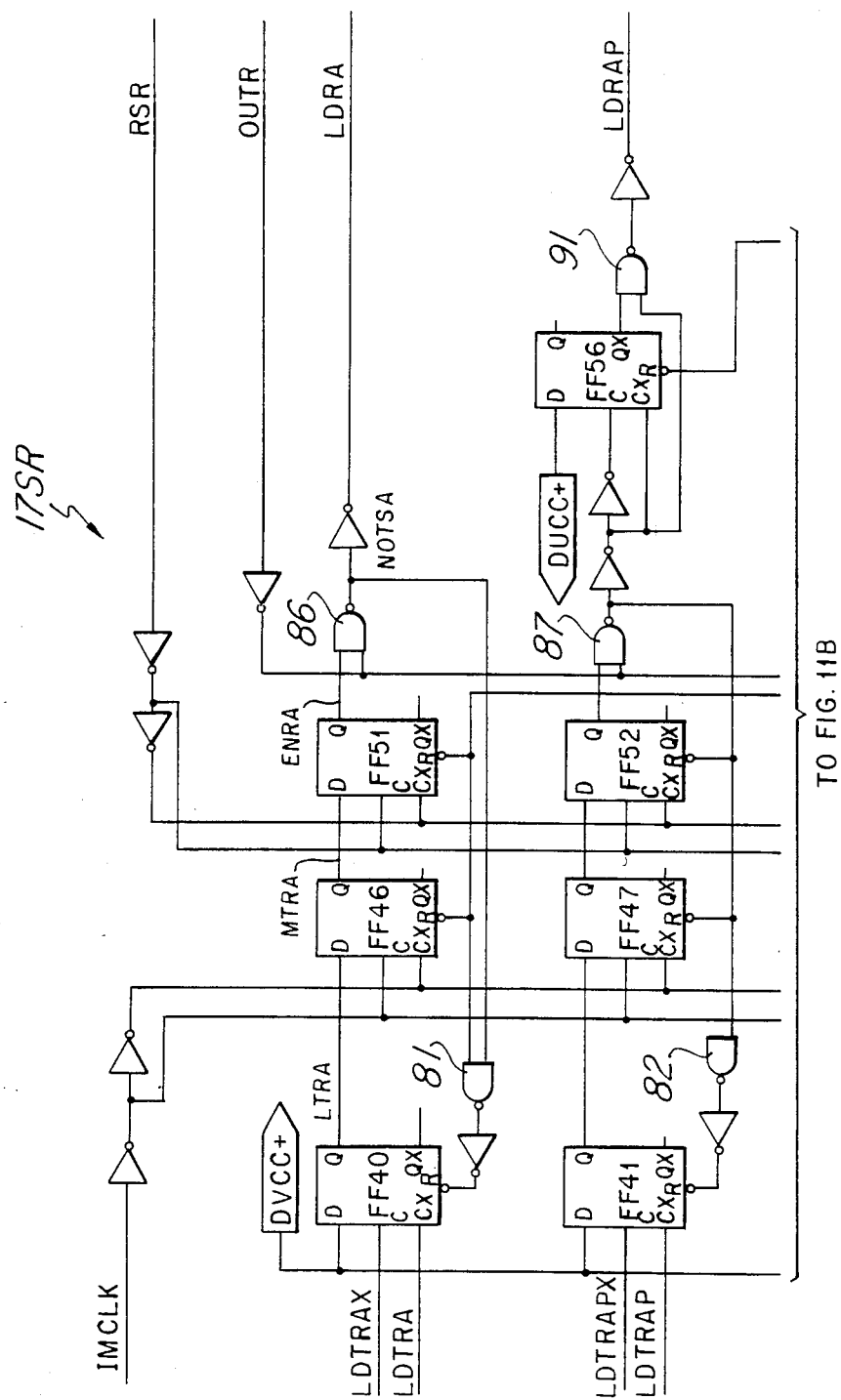
FIGS. 11A and 11B joined together form a schematic of the receive asynchronous/synchronous timing control.
Figure 11B:
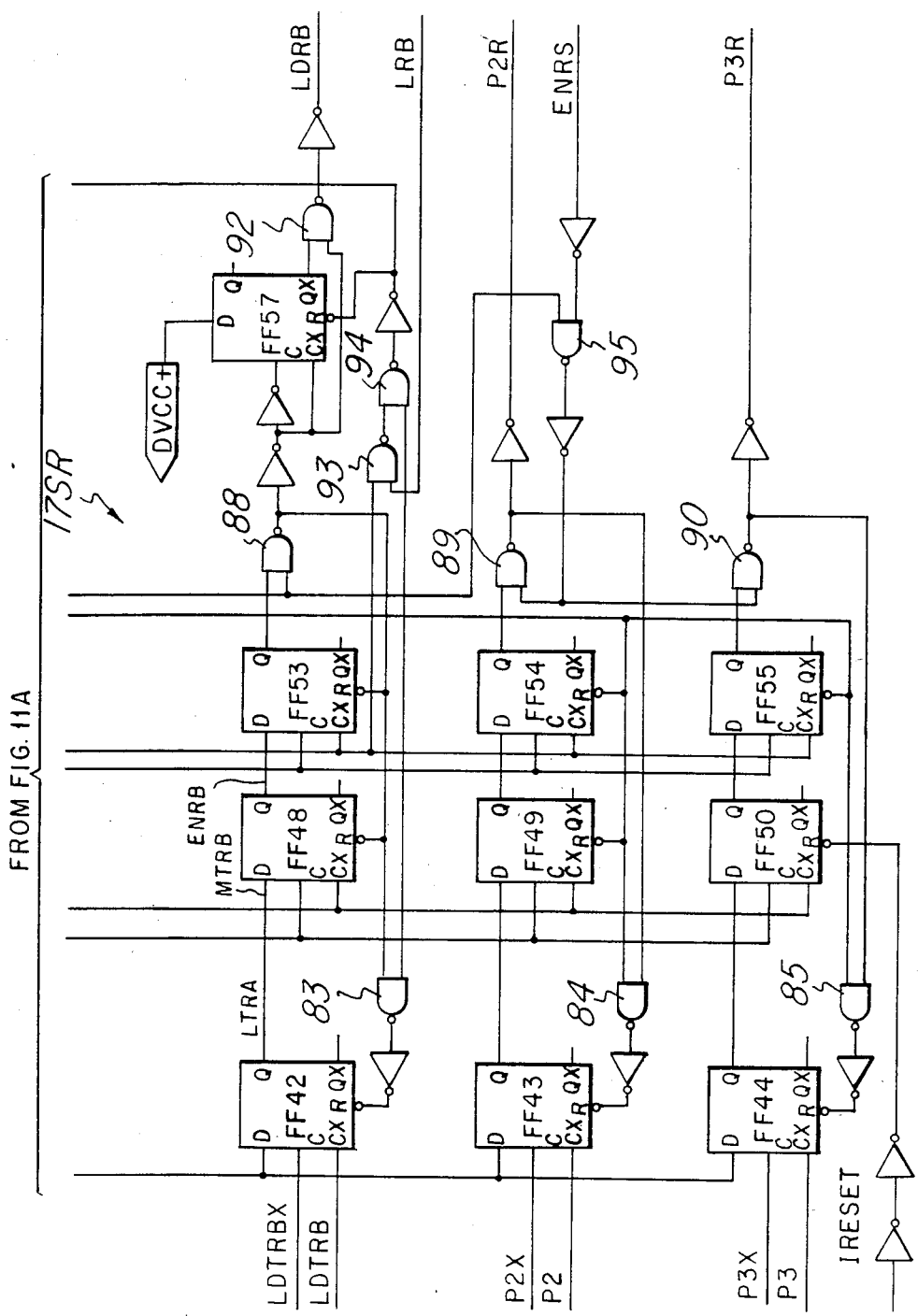

FIGS. 11A and 11B, the schematic of the receive asynchronous timing control 17SR is essentially the same as FIGS. 10A and 10B, the schematic for the transmit asynchronous timing control. In FIG. 11A, signal RSR replaces signal RST from FIG. 10A, signal OUTR replaces signal OUTT, and signals LRB and ENRS have been added as inputs to FIG. 11B. Signal ENRS is originated in receive timing control section 17R and is used to inhibit a normal cycle upon changing to asynchronous operation. Signal LRB is output from RB counter 19R and is used for reset in case of an error detection.

In FIG. 11A, NAND gate 87, which corresponds to NAND gate 74 in FIG. 10A, has its output inverted twice and input to the C input of flip flop FF56 whose D input is connected to reference voltage DVCC+. The output from NAND gate 87, once inverted, is applied to the CX input of flip flop FF56 and to one input of NAND gate 91 whose other input is provided by the QX output from flip flop FF56. The output of NAND gate 91, inverted, is signal LDRAP.

In FIG. 11B, NAND gate 88, which corresponds to NAND gate 78 in FIG. 10B, has its output inverted twice and connected to the C input of flip flop FF57 whose D input is connected to reference DVCC+. The output from NAND gate 88, once inverted, is connected to the CX terminal of flip flop FF57 and also to one input of NAND gate 92, whose other input is provided by terminal QX of flip flop FF57. The output of NAND gate 92 is inverted to form output signal LDRB.

Also different from FIG. 10B, are the following additions. NAND gate 93 has one input from signal RSR, twice inverted, and the other input from input signal LRB. NAND gate 93 provides one input to NAND gate 94 whose other input is provided by signal IRESET, twice inverted. The output from NAND gate 94, inverted, is connected to the R terminal of flip flop FF57 and flip flop FF56.

Figure 12A:
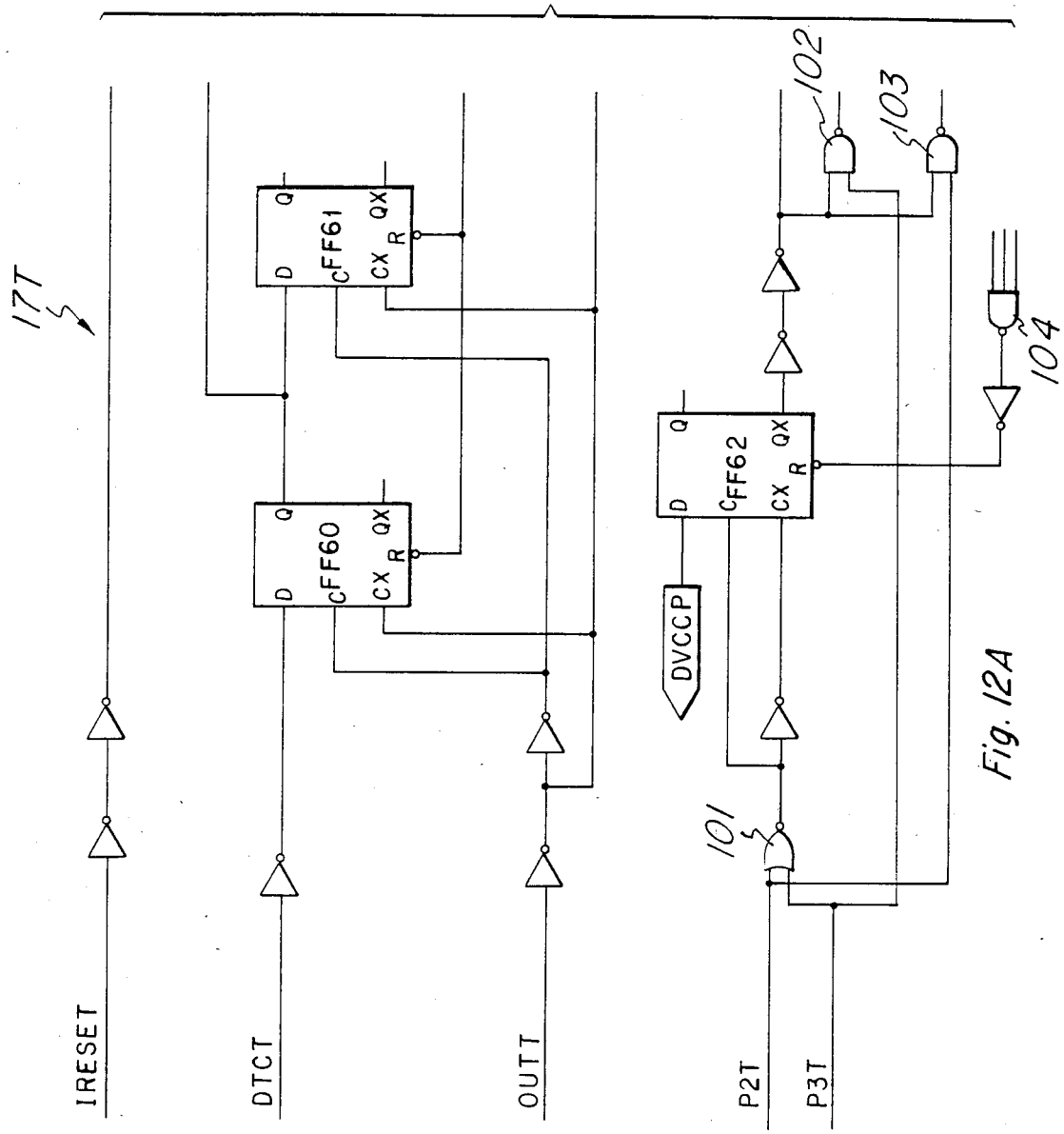
FIGS. 12A and 12B schematically illustrate a transmit timing control section.
Figure 12B:
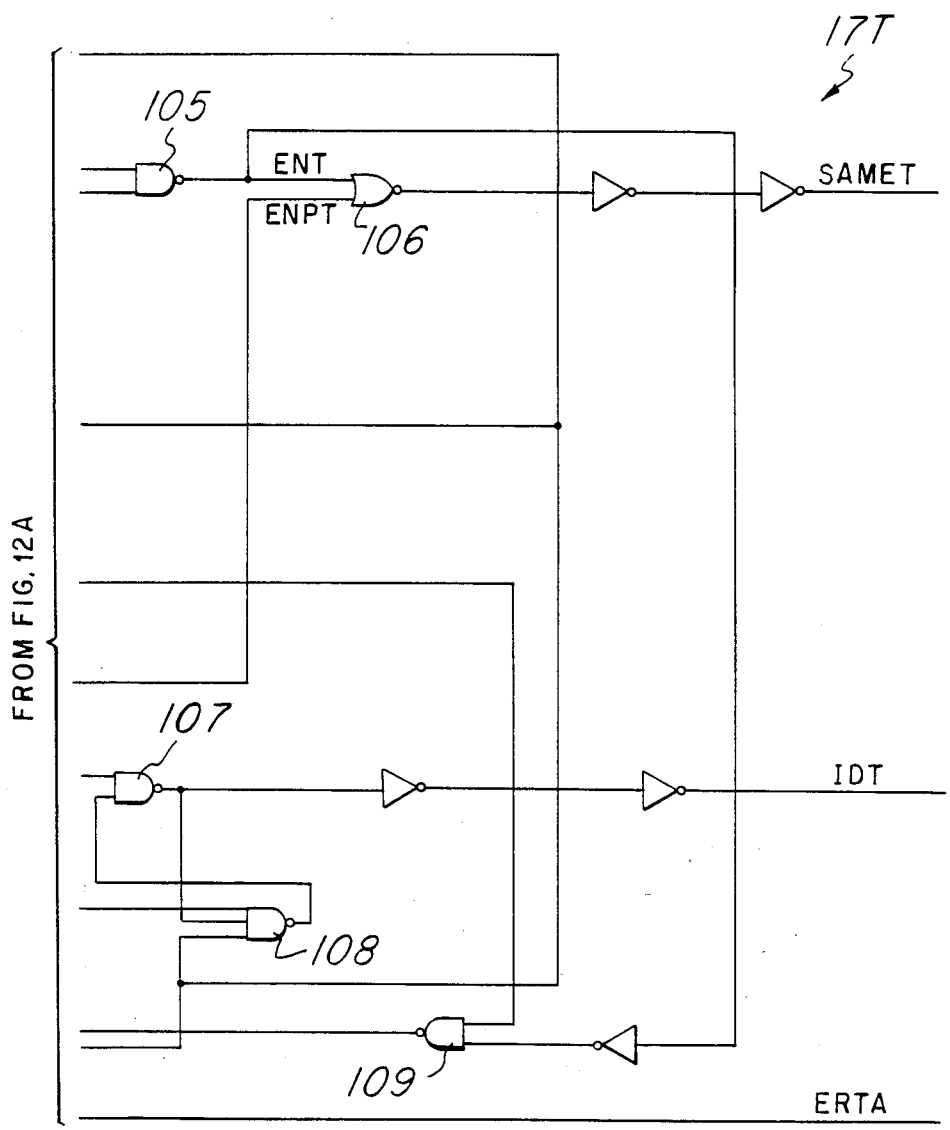

NAND gate 95 has, as one input, signal ENRS inverted and as another input has signal OUTR, inverted. The output from NAND gate 95 is inverted and provides one input to NAND gate 90. The other input is provided from the Q output of flip flop FF55. The output from NAND gate 90 is inverted and provides output signal P3R. FIGS. 12A and 12B form a schematic diagram of the transmit timing control section 17T, for further development of the timing signals used in the system. The reset signal IRESET is inverted twice and applied to the R terminals of flip flops FF60 and FF61 and also as one input to each of NAND gates 105 and 108.

Figure 14A:
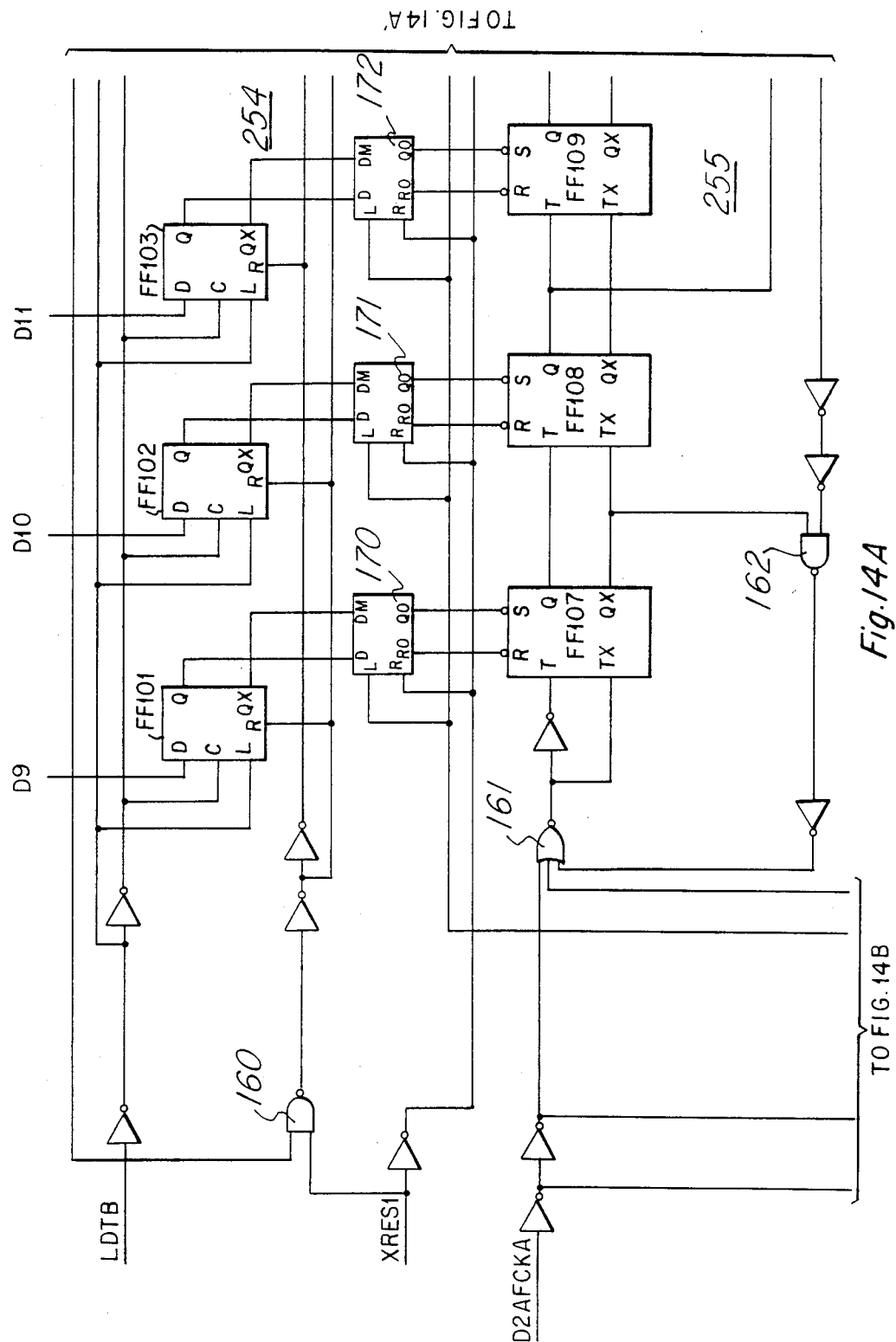
FIGS. 14A and 14B form a schematic diagram of the TB counter.
Figure 14A:
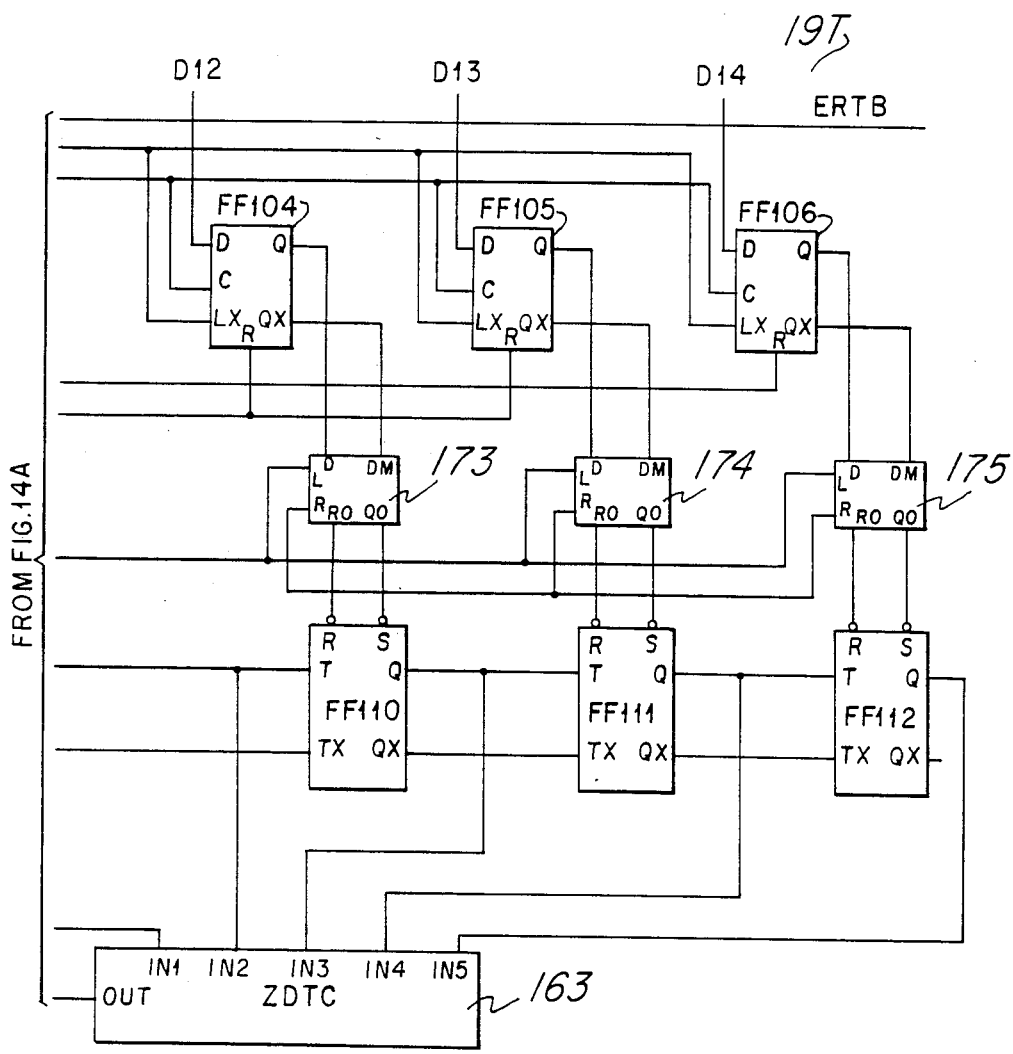
Figure 14B:
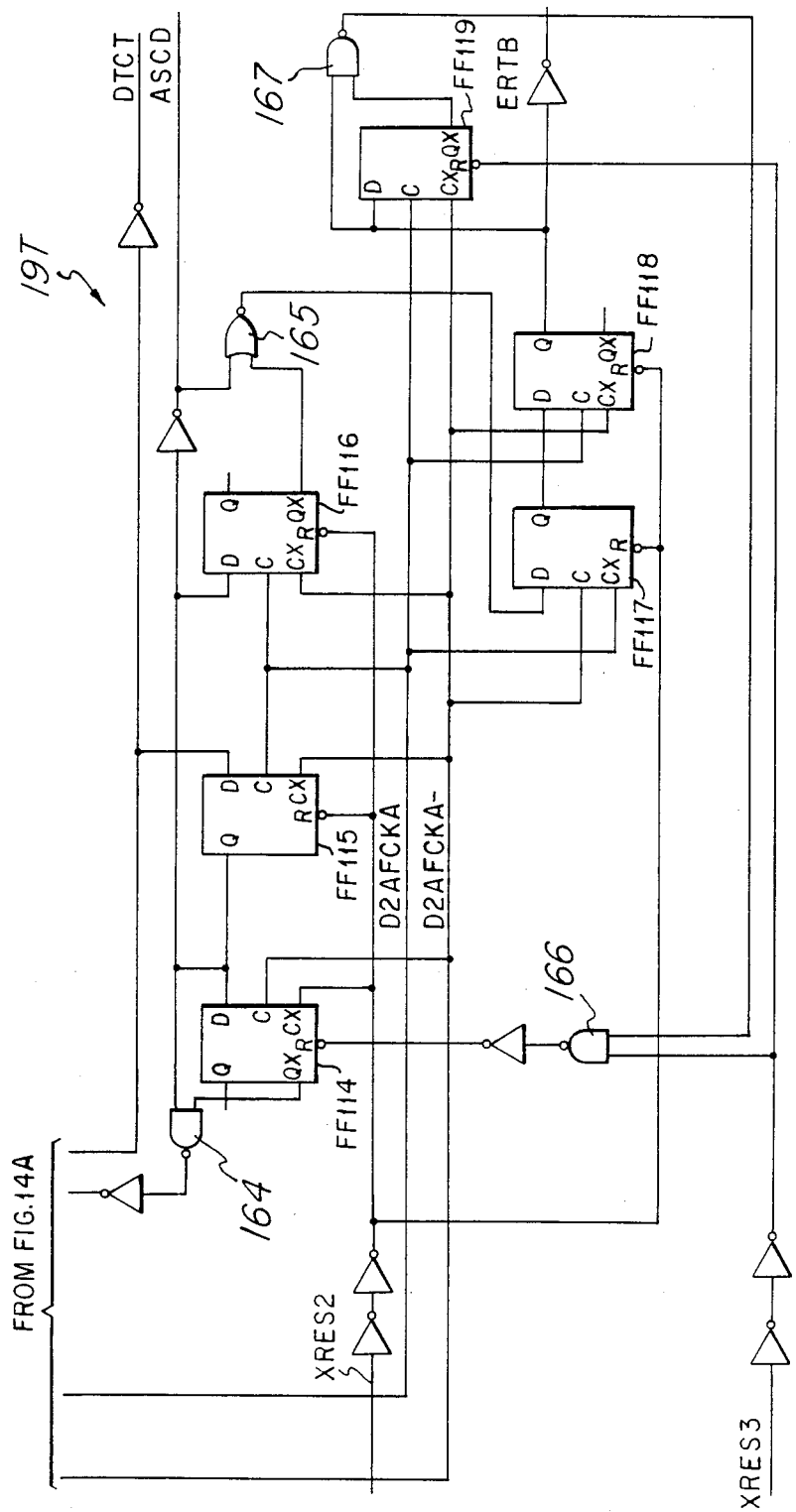

Signal DTCT, from TB counter 19T, shown in FIG. 14B, is inverted and applied to the D input of flip flop FF60 whose Q output provides the input to flip flop FF61 and also provides one input to NAND gate 105. The QX output of flip flop 61 provides the other input to NAND gate 105 whose output provides one input to NOR gate 106 SIGNAL OUTT from FIG. 10B, an output of the transmit asynchronous timing control 17ST, is inverted and applied to the CX inputs of each of flip flops FF60 and FF61, and inverted again and applied to the C input of each of flip flops FF60 and FF61. The single inversion of signal OUTT is also applied as the other input to NOR gate 106, whose output is inverted twice, resulting in output signal SAMET.

Signals P2T and P3T from the transmit asynchronous timing control 17ST shown in FIG. 10B, are applied as inputs to NOR gate 101 whose output is applied to the C terminal on flip flop 62 and whose inverted output is applied to the CX terminal of flip flop FF62. Signal P2T is also applied as one input to NAND gate 103. Signal P3T is applied as one input to NAND gate 102. The QX output from flip flop FF62 is inverted twice and applied as inputs to each of NAND gates 102, 103 and 107. The output of NAND gate 102 provides the other input to NAND gate 107. The output from NAND gate 107 provides an input to NAND gate 108 whose output provides the other input to NAND gate 107. The output from NAND gate 107 is twice inverted, providing output signal IDT.

Figure 13A:
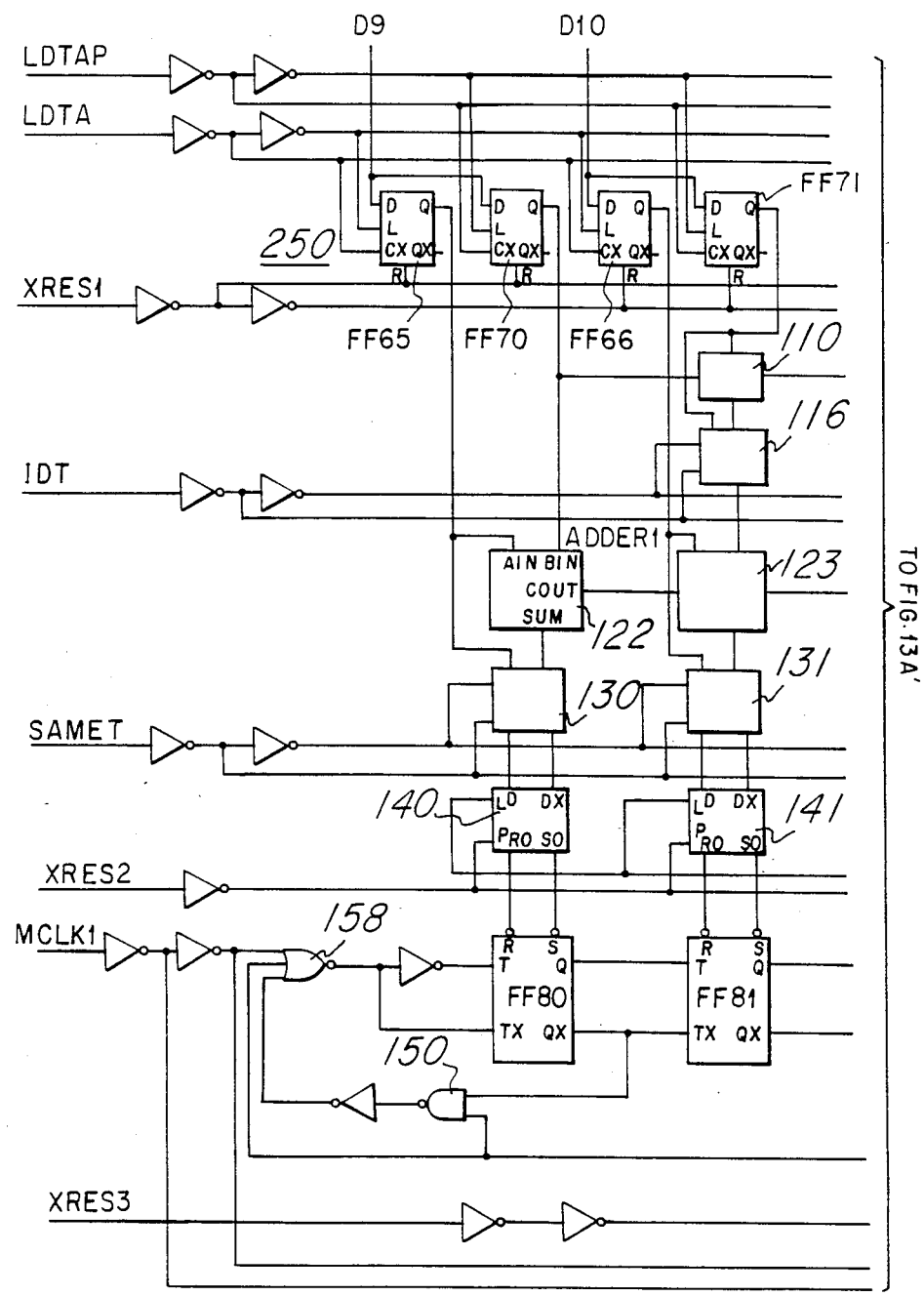
FIGS. 13A and 13B, joined together, form a schematic of the TA counter.
Figure 13A:
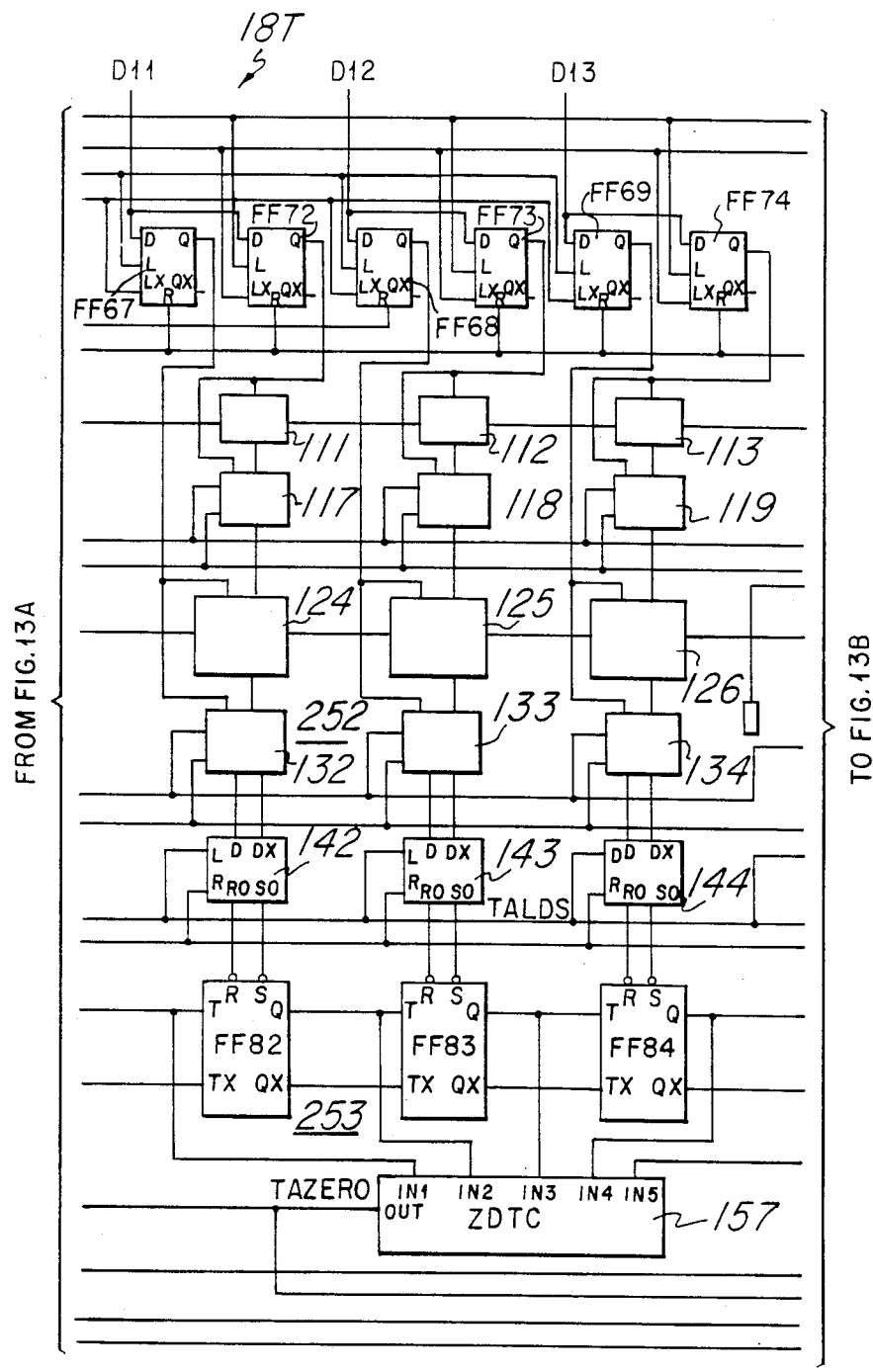
Figure 13B:
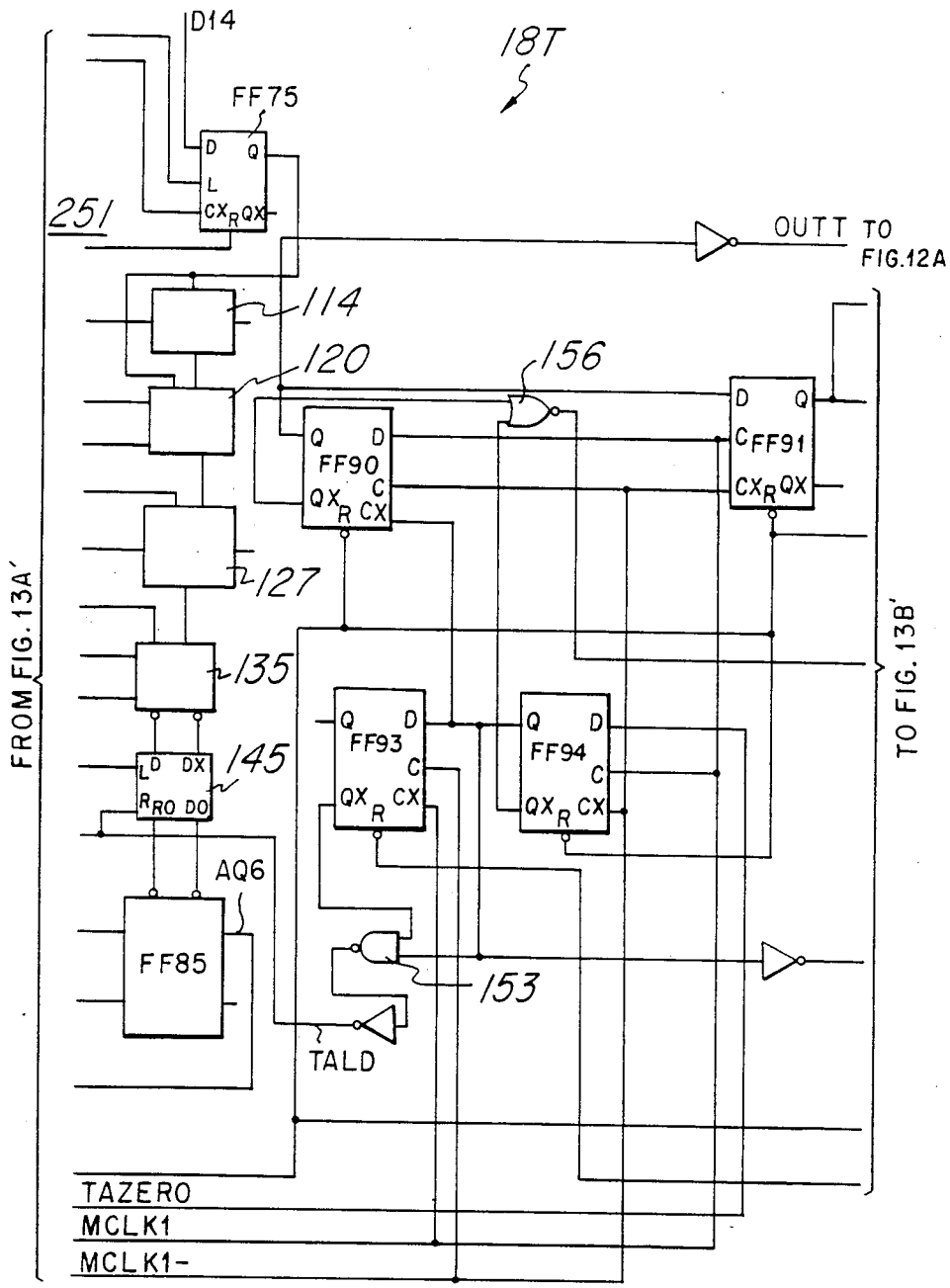
Figure 13B:
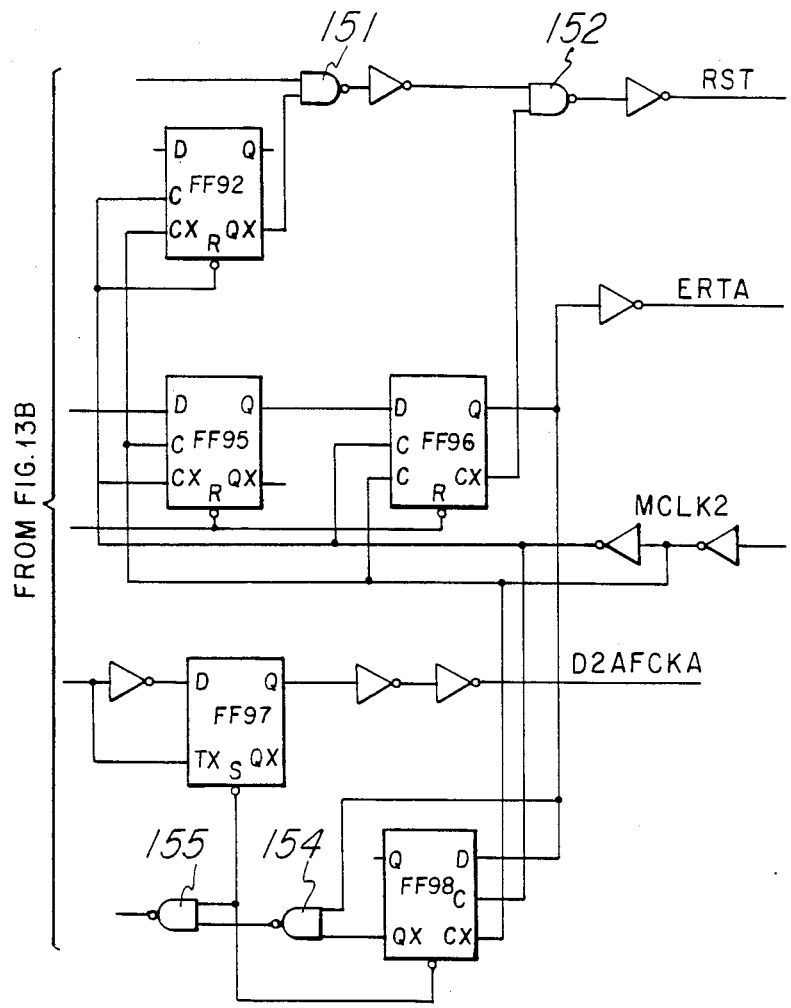

Input signal ERTA from TA counter 18T, shown in FIG. 13B, provides an input to NAND gate 104. The output of NAND gate 104 is inverted and is applied to the R terminal of flip flop FF62.

Receive timing control section 17R is identical to section 17T and therefore will not be described, except to notes that inhibit signal ENRS.

FIGS. 13A and 13B schematically give the details of TA counter 18T and its input registers, adder and counter. Flip flops FF65-FF69 make up a 5 bit TA register. Flip flops FF70-FF75 make up a 6 bit TA' register. Signal LDTA, from the transmit asynchronous timing control 17ST shown in FIG. 10A is inverted once and applied to the LX input of flip flops FF65-FF69. Signal LDTA is inverted twice and applied to the L input of flip flops FF65-FF69.

Signal LDTAP, also shown in FIG. 10A, is inverted once and applied to the LX input of flip flops FF70-FF75, the TA' register. Signal LDTAP is inverted twice and applied to the L input of each of flip flops FF70-FF75. Signals D9-D13 are applied to the D inputs of flip flops FF65-FF69 and FF70-FF75. Signals D9-D13 are applied, respectively, to the D inputs of pairs of flip flops FF65, FF70-FF69, FF74. Signal D14 is applied to the D input of flip flop FF75. Two's complement circuits 110-114 receive information from FF71-FF75, with a CX input of circuit 110 being provided by the Q output from flip flop FF70. An output from circuit 110 provides the CX input to two's complement circuit 111, circuit 111 provides the CX input to circuit 112 and so on. The two's complement circuits complement the contents of the TA' rgister.

Multiplexers 116-120 receive inputs, respectively, from the D outputs of flip flops FF71-FF75, and from circuits 110-114. The SL input to these multiplexers 116-120 is supplied by signal IDT (from the transmit timing control section 17T, shown in FIG. 12B). The SLX input to these multiplexers 116-120 is applied by signal IDT, once inverted. These multiplexers serve to pass the data (two's complement) from circuits 110-114 or directly (one's complement) from the TA' register.

Adders 122-127 from the 6 bit TA adder/subtracter. Adder 122 receives the D output from flip flops FF65 and FF70. Flip flops 123-126 receive, respectively, the outputs from FF66 and multiplexer 116, flip flop FF67 and multiplexer 117; the D output from flip flop FF68 and multiplexer 118; the D output from flip flop FF69 and multiplexer 119. Adder 127 receives one input from multiplexer 120, and its other input is grounded. The 6 bit TA adder/subtracter sums TA and TA'. Signal IDT, inverted and applied to each adder determines whether there will be an add or a subtract.

Multiplexers 130-135 receive inputs, respectively, from the Q output of flip flop FF65 and the sum output from adder 122; adder 123 receives the Q output from flip flop FF66 and the sum output from adder 123; multiplexer 132 receives the Q output from flip flop FF67 and the sum output from adder 124; multiplexer 133 receives the Q output from flip flop FF68 and sum output from adder 125; multiplexer 134 receives the Q output from flip flop FF69 and the sum output from adder 126. Multiplexer 135 receives the sum input from adder 127 and its other input is grounded. The SL input of each of multiplexers 130-135 has signal SAMET from timing control section 17T shown in FIG. 12B twice inverted, applied to the SL input and once inverted applied to the SLX input. Signal SAMET determines whether there will be an increment or a decrement.

Multiplexers 140-145 receive their D and DX inputs from the outputs of multiplexers 130-135, respectively. The R input of each of these multiplexers is supplied by reset signal XRES2 (once inverted). Signal TALD, the inverted output from NAND gate 153, supplies the L input to each of multiplexers 140-145. These multiplexers are used to preset the counter made up of flip flops FF80-FF85. They store the data to be entered into the counter.

Flip flops FF80-FF85 receive the output from the RO and SO terminals of each of multiplexers 140-145 being applied, respectively, to the R and S terminals of each of flip flops FF80-FF85. The T input of flip flop FF80 is supplied by the output from NOR gate 158, inverted, and the TX input is supplied by the output of NOR gate 157, directly. NOR gate 157 has master clock signal MCLAK1 as one input, signal TAZERO from zero detector 157 as another input and the output from NAND gate 150, inverted, as its third input. Output terminal QX supplies one input to NAND gate 150 whose other input is supplied by signal TAZERO. Each of flip flops FF80-FF84 have their Q output tied to the T input of the next in order flip flop and their QX output tied to the TX input of the next in order flip flop. That is, flip flop FF80 has its Q output tied to the T terminal of flip flop FF81 and its QX output tied to the TX terminal of flip flop 81, and so forth, with flip flop FF84 having its Q output tied to the T terminal of FF85 and its QX output tied to the TX terminal of flip flop FF85. Flip flops FF81-FF85 have their Q outputs tied, respectively, to terminals IM1-IM5 of unit 157.

Signal TALD can be stored in multiplexers 140-145, and acts as a gate to permit the data from multiplexers 130-135 to be stored in multiplexers 140-145. Signal TALD responds to signal TAZERO, as will be shown, for resetting and permitting entry of new data into the counter 253 formed by flip-flops FF80-FF85.

Signal TALD is the inverted output from NAND gate 153 whose inputs are the QX output from flip flop FF93 and the Q output from flip flop FF94. The C input and the CX input of each of flip flops FF93 and FF94 are supplied by signals MCLK1- and MCLK1, respectively. The D input to flip flop FF94 is provided by signal TAZERO from zero detector 157. The Q output of flip flop FF94 is connected to the D input of flip flop FF93 and also to the D input of flip flop FF90. The C and CX inputs to flip flop FF90 are provided by clock signals MCLK1 and MCLK1-, respectively. The Q output from flip flop FF90 is inverted and provides the output signal OUTT. The QX output from flip flop FF90 provides one input to NOR gate 156 whose other input is provided by the QX output from flip flop FF94. The output from NOR gate 156 provides the D input fo flip flop FF95. The Q output from flip flop FF90 also provides the D input to flip flop FF91 whose Q output provides an input to the D input of flip flop FF92. The Q output from flip flop FF91 provides one input to NAND gate 151, the other input being provided by the QX output from flip flop FF92. NAND gate 151 has an output inverted and applied as an input to NAND gate 152 whose other input is provided by the QX output from flip flop FF96. The output from NAND gate 152 is inverted and supplies signal RST. The C input of flip flop FF92 and flip flop FF96, and the CX input of flip flop FF95 are provided by clock signal MCLK2, twice inverted. The CX inputs to flip flops FF92 and FF96 and the C input to flip flop FF95 are provided by clock signal MCLK2, once inverted. The Q output from flip flop FF95 provides a D input to flip flop FF96 whose Q output, once inverted, provides output signal ERTA and also provides the D input to flip flop FF98 and one input to NAND gate 154.

Toggle flip flop FF97 has its T input provided by the Q output from flip flop FF94, twice inverted. The TX input is provided by that signal, once inverted. The QX output from flip flop FF98 provides the other inputs the NAND gate 154 which in turn provides an input to NAND gate 155. The other input to NAND gate 155 is the reset signal XRES3. The output from NAND gate 155, inverted, is connected to the reset input of flip flop FF93. The Q output from flip flop FF97 is twice inverted and provides output signal D2AFCKA.

In summary, TA counter 18T is used for increment-/decrement through the use of the TA and TA' additional and ultimate counting. From that, the signals OUTT, RST, ERTA and D2AFCKA are generated and used as shown.

RA counter 18R is identical to TA counter 18T and will not be described. It should be noted that the differences are in the input and output signal designations. Signals D2-D7 from input data register 22 are entered into the register of RA counter 18R. Input signals LDRA and LDRAP replace input signals LDTA and LDTAP. Input signals IDR1 and SAMER replace input signals IDT and and SAMET. Output signals OUTR, RSR, ERRA, and A2DFCKA replace output signals OUTT, RST, ERTA and D2AFCKA. RA counter 18R therefore provides the same functions as the TA counter, but with the difference in signal designations as set out above.

FIGS. 14A and 14B, joined as shown, form a schematic diagram of TB counter 19T. Flip flops FF101-FF106 form the TB register 254 with their D inputs supplied by signals D9-D14 from input data register 22. Signal LDTB output from transmit asynchronous timing control 17ST, shown in FIG. 10B, inverted, provides the LX input to flip flops FF101-106, and twice inverted provides the L input to those flip flops. Signals XRES1, XRES2 and XRES3, input as shown, are simply used for resetting all of the circuits when the power is applied. The Q and QX output of each of flip flops FF101-FF106 provide the D and DX inputs to each of multiplexers 170-175, respectively. The R input of multiplexers 170-175 is provided by signal XRES1, once inverted. The L input of each of these multiplexers is provided by the output from NAND gate 164, once inverted. Outputs R0 and S0 of each of multiplexers 170-175 are applied to the reset and set inputs of flip flops FF107-FF112 which form counter B 255. The Q output from each of flip flops FF108-FF112 provide inputs to zero detector 163. The output from zero detector 163 is twice inverted and provides an input to NAND gate 162 and NOR gate 161. The output from NAND gate 162, inverted, provides another input to NOR gate 161. The third input to NOR gate 161 is supplied by signal D2AFCKA which is the filter clock frequency supplied by flip flop FF97, shown in FIG. 13B from TA counter 18T. The output of NOR gate 161 is inverted and connected to the T input of toggle flip flop FF107. The output of NOR gate 161 provides the TX input to flip flop FF107. The Q output of flip flops FF107-FF111 are connected to the T input of flip flops FF108, FF109, FF110, FF111 and FF112, respectively. The QX output of flip flops FF107-FF111 are tied to the TX input of flip flops FF108, FF109, FF110, FF111 and FF112, respectively. The QX output from flip flop FF107 also provides one input to NAND gate 162.

The output from zero detect 163, twice inverted, provides the D input to flip flop FF115, and again inverted provides output signal DTCT. The C input to each of flip flops FF114, FF115, FF116 and FF118 are supplied by signal D2AFCKA. The CKX input to flip flop FF117 is also provided by signal D2AFCKA. Signal D2AFCKA- provides the CX input to flip flops FF114, FF115, FF116 and FF118, and the C input to flip flop FF117. The Q output of flip flop FF115 provides the D input to flip flop FF114, one input to NAND gate 164, and inverted, one input to NOR gate 165 as well as providing the output signal XSCD2A which is the D-to-A conversion start signal. The other input to NAND gate 164 is from the QX output of flip flop FF114. The output of NAND gate 164 is inverted and provides inputs to multiplexers 170-175 as detailed above. The QX output of flip flop FF116 provides the other input to NOR gate 165 whose output provides the D input to flip flop FF117. The Q output from flip flop FF117 provides the input to flip flop FF118 whose Q output is connected to the D input of flip flop FF119, one input of NOR gate 167, and inverted provides the error signal ERTB. The QX output from flip flop FF119 provides the other input to NAND gate 167 whose output provides an input to NAND gate 166 whose other input is provided by reset signal XRES3, twice inverted. The output from NAND gate 166 is inverted and provides the reset input to flip flop FF114.

TB counter 19T provides the D-to-A conversion frequency, depending upon the value of signals D9-D14. Further, an error detection is made as illustrated by signal ERTB which is output and also provides an input to NAND gate 160 for reset in the event of an error as originally detected in the zero detector 163.

RB counter 19R is identical to TB counter 19T and will not be described.

FIGS. 15A and 15B, joined as shown, form a schematic diagram of the transmit control section 20X. Word bit signal WB1 from the digital signal processor is inverted and is applied to one input of NAND gate 195. Signal PLD is also from the digital signal processor and indicates that a secondary command should be picked up. Signal PLD is applied to one input of NAND gate 197, the other input of which comes from the inverted output of NOR gate 204 (signal XCTLA). The output from NAND gate 197 provides the other input to NAND gate 195 and also one input to NOR gate 196. The output of NAND gate 195 provides one input to NAND gate 184. The output of NOR gate 196 is inverted and applied to the D input of flip flop FF130 whose Q output is applied to the D input of flip flop FF131 and also to one input of NAND gate 203 whose other input is provided by the QX output from flip flop FF131. The Q output of flip flop FF131 is applied to the D input of flip flop FF126 whose QX output provides one input to NAND gate 202. NAND gate 201 provides another input to NAND gate 202 whose third input is provided by the reset signal XRES1. The output of NAND gate 202 provides an input to NAND gate 201 and the output of NAND gate 201 provides an input to NAND gate 198 whose other input is provided by the output of zero detector 190, twice inverted.

Signal XSCD2A, the signal for starting the D-to-A conversion is inverted and applied to the D input of flip flop FF133. The Q output of flip flop FF133 is applied to the D input of flip flop FF134 and also to one input of NOR gate 204. The other input to NOR gate 204 is supplied by the QX output from flip flop 134. The output of NOR gate 204 is inverted, providing output signal XCTLA.

Error detection signal ERTB is inverted and applied as one input to NOR gate 205 whose output provides the reset input for flip flops FF133 and FF134. Clock signal IMCLK is inverted twice and provides the C input to flip flop FF136, and inverted once, provides the CX input to that flip flop whose Q output is signal FSXCK. Input signal SCK1 is inverted twice and provides an input to NAND gate 187. The other input to NAND gate 187 is a signal from zero detector 190, inverted once. NAND gate 187 inverted once provided the T input to toggle flip flop FF121 and directly provides the TX input to that flip flop. The Q and QX output from each of flip flops FF121, FF122, and FF123 provide the T and TX inputs to FF122, FF123, and FF124, respectively. The Q output from each of flip flops FF121-FF124 are input to zero detector 190.

Signal WB2 from the digital signal processor is inverted and applied as one input of NAND gate 192. Signal WB2, twice inverted, is applied as one input to NAND gate 191. The other input to NAND gate 192 comes from NAND gate 193 whose output is inverted once. The other input to NAND gate 191 comes from the output of NOR gate 188, twice inverted. The outputs from NAND gates 191 and 192 provide the inputs to NAND gate 189 whose output, once inverted, provides output signal EODXI.

The D input to flip flop FF129 is provided by the output, once inverted, from zero detector 190. The Q output from flip flop FF129 provides the D input to flip flop FF128 and one input to each of NOR gates 188 and 196. The Q output from flip flop FF129 also provides the D input to flip flop FF132 whose QX output provides the other input to NOR gate 188. The QX output of flip flop FF128 provides the other input to NOR gate 196 which, has an output twice inverted, supplying the D input to flip flop 127 and also providing one input to NAND gate 185. The QX output from flip flop FF127 provides an input to NAND gate 186 whose other inputs are provided by the reset signal XRES1 and the output of NAND gate 184. The output from NAND gate 186 provides one input to NAND gate 184 whose other input, as mentioned earlier, is supplied by NAND gate 195. The output from NAND gate 184 provides the other input to NAND gate 185 whose output, once inverted, provides one input to NOR gate 207 whose other input is provided by reset signal XR2S3, once inverted. The output from NAND gate 185, twice inverted, provides the D input to multiplexers 180-183.

Signal IMCLK, twice inverted, provides the C input to flip flop FF136 and once inverted provides the CX input. The D input flip flop FF136 is provided by the output from NOR gate 210. One output to NOR gate 210 is provided by the output from NAND gate 209, twice inverted. The other input to NOR gate 210 is provided by input signal SCK2, twice inverted. The output of flip flop FF136 provides signal FSXCK.

The output from NAND gate 209, three times inverted, provides output signal XIFSX.

The output from NAND gate 206, twice inverted, provides output signal XLDD.

In summary, section 20X provides control signals as indicated.

Figure 16A:
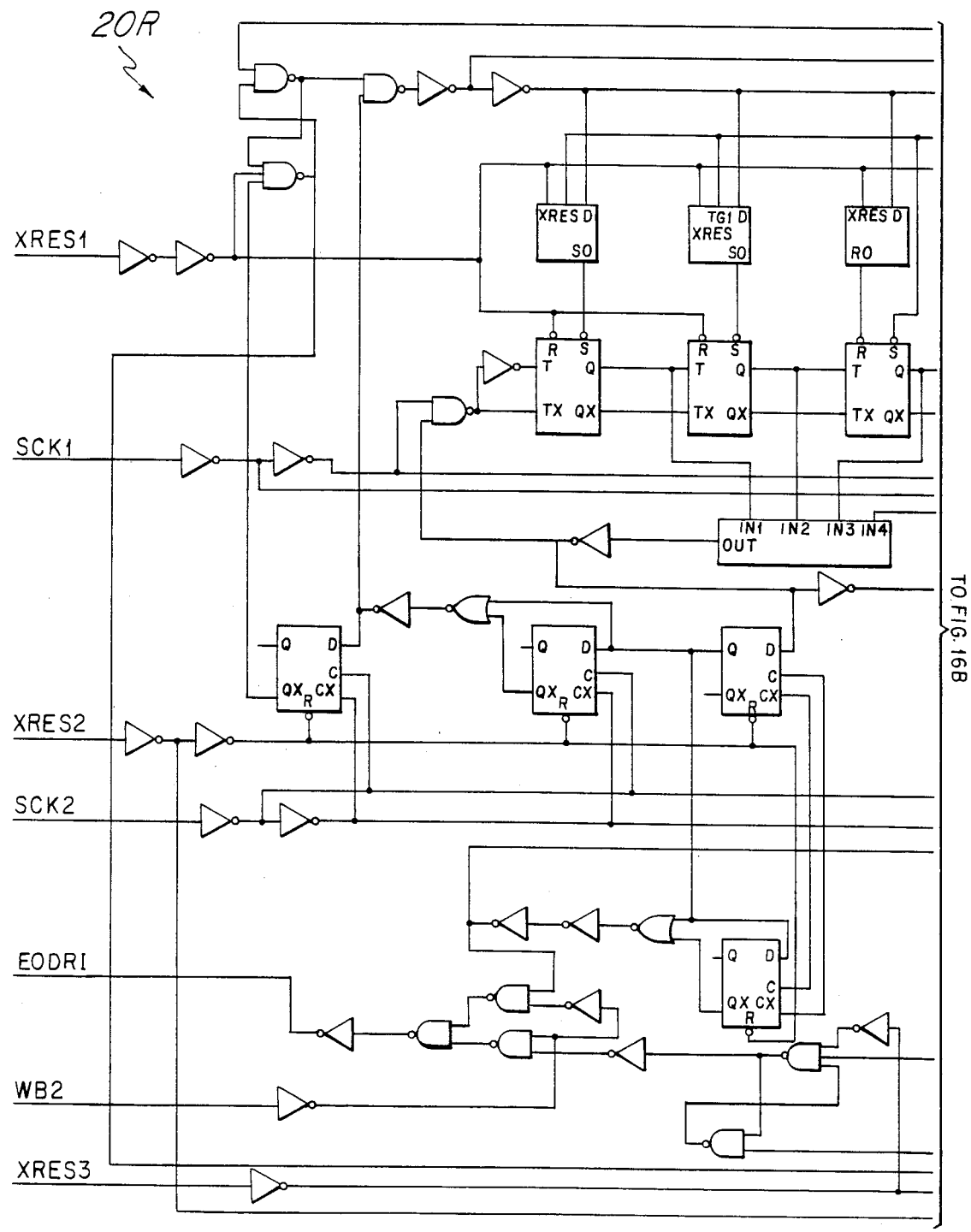
FIGS. 16A and 16B form a schematic diagram of the receive control portion.
Figure 16B:
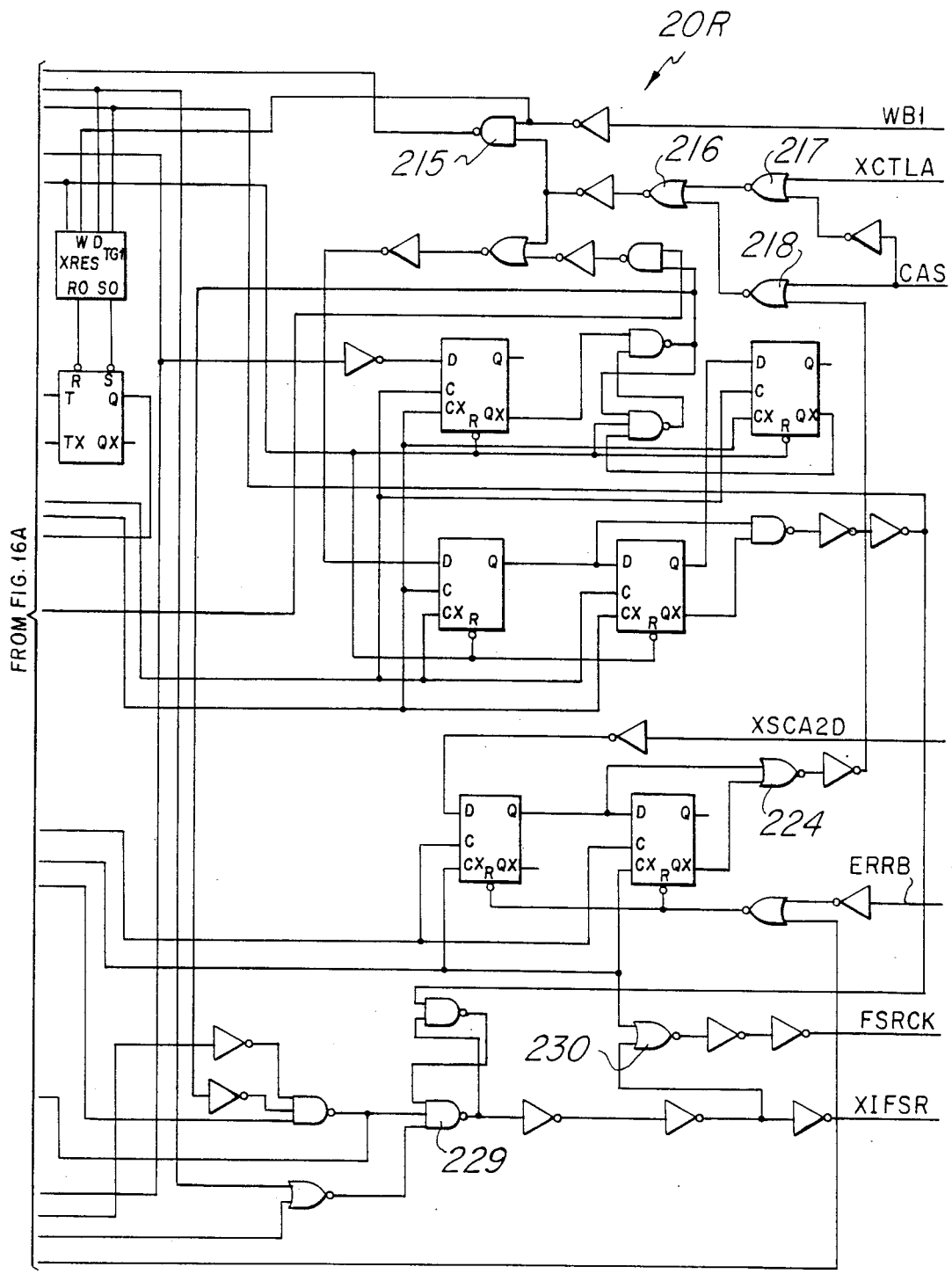

The receive control section 20R is shown in FIGS. 16A and 16B, joined as indicated. The circuit is nearly identical to FIG. 15 but has some differences which are indicated in FIG. 16B. NAND gate 215, which is the equivalent of NAND gate 195 in FIG. 15B has input WB1, once inverted. The other input, however, is provided by the output of NOR gate 216, once inverted. One input to NOR gate 217 is provided by signal XCTLA and the other input is provided by signal CAS, once inverted. The CAS signal is a control asynchronous signal and is used in the situation where a cycle must be postponed to commence the conversion when the command to convert comes during an asynchronous mode and is too close to the starting of such a mode. The output of NOR gate 217 provides one input to NOR gate 216 and the other input is provided by the output from NOR gate 218.

NOR gate 224, the equivalent of NOR gate 204 in FIG. 16B, has its output inverted and provides one input to NOR gate 218 whose other input is provided by signal CAS.

NOR gate 230, the equivalent of NOR gate 210 in FIG. 15B, has its output inverted twice and is not stored in any equivalent of flip flop FF136 shown in FIG. 15B, but twice inverted provides ouput signal FSRCK.

Also, NAND gate 229, the equivalent of NAND gate 209 in FIG. 15B has an output that is twice inverted and provides another input to NOR gate 230 and also provides output signal XIFSR.

There is no equivalent in FIG. 16B for the output signal XLDD.

In summary, the receive control section 20R as shown provides the output signals mentioned.

Figure 17:
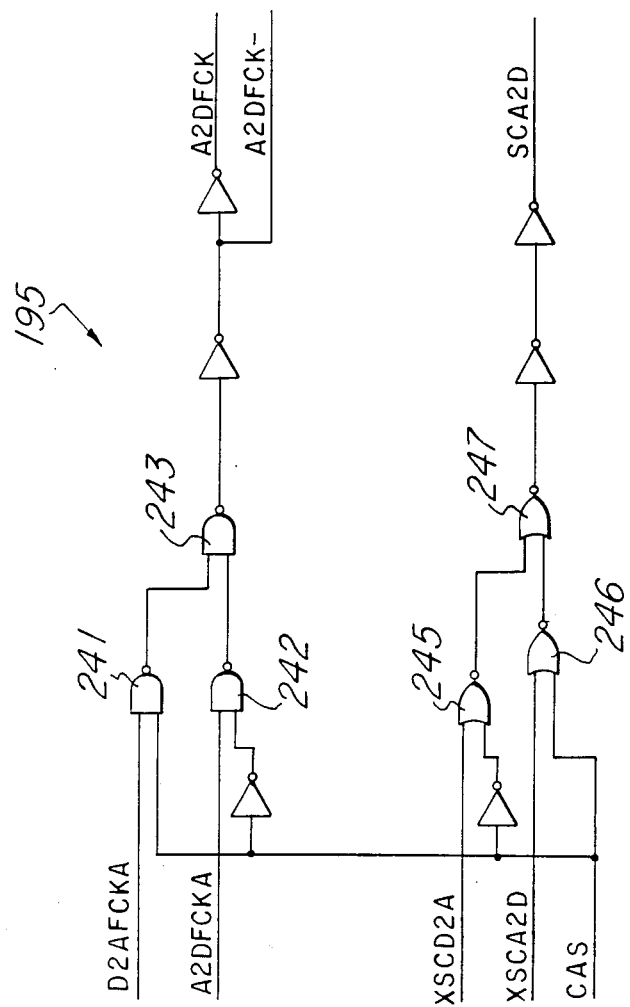
FIG. 17 schematically illustrates a synchronous-asynchronous output section.

FIG. 17 is the synchronous/asynchronous control 19S for providing the converter sampling rate. This circuit further determines whether the operation of the AIC is to be synchronous or asynchronous.

Signal D2AFCKA is from TA counter 18T, shown in FIG. 13B and provides one input to NAND gate 241. The other input to NAND gate 241 is from control asynchronous signal CAS. Signal A2DFCKA is from the RA counter 18R and provides one input to NAND gate 242. The other input to NAND gate 242 is provided by signal CAS, once inverted. The outputs from NAND gates 241 and 242 provide the inputs to NAND gate 243 whose output, once inverted, provides signal A2DFCK- and twice inverted provides signal A2DFCK.

Signal XSCD2A from TB counter 19T as shown in FIG. 14B, provides one input to NOR gate 245. The other input to NOR gate 245 is provided by signal CAS, once inverted. NOR gate 246 has as one input signal XSCA2D from RB counter 19R and has its other input supplied by signal CAS. NOR gates 245 and 246 provide the inputs to NOR gate 247 whose output, twice inverted, provides output signal ACA2D.

In the case of synchronous operation, the output signal SCA2D is the same as the input signal XSCD2A. In the case of asynchronous operation, the output signal SCA2D is the same as input signal XSCA2D.

Output signal A2DFCK is the same as input signal D2AFCKA when the operation is synchronous. Otherwise, when it is in the asynchronous mode, then the output signal A2DFCK is the same as input signal A2DFCKA.

MODE OF OPERATION OF THE INVENTION

Turning first to FIG. 1, two sets of analog inputs may be received into multiplexer 11. Normally, the IN and IN- input set is used, however, the auxiliary input set AUX IN and AUX IN- can be used if a second input is required. Each input set can be operated in either differential or single-ended modes, since sufficient common-mode range and rejection are provided. The gain for the analog inputs can be programmed to be either 1, 2 or 4. Signals C1X, C2X, C4X and their negations from control register 16R as shown in FIG. 9B control that gain.

Bandpass filter 12 can be selected or bypassed by signals CBP and CBP- from control register 16R, shown in FIG. 9A. The gain and bypass control is determined by signals D2–D7 from input data register 22 which in turn receives the information from the digital signal processor (DSP) shown in FIG. 2.

The output from bandpass filter 12 is applied to A-to-D converter 14 where it is converted into digital data and sent to output data register 15. From output data register 15, under control of the communication signal generator 20, the data is sent to the DSP.

Also under control of the communication signal generator 20, digital data is transmitted from the DSP to input data register 22. It is converted into analog data through D-to-A converter 24. The analog output from D-to-A converter 24 is ultimately applied to low pass filter 28 and output through an analog output power amplifier which provides both the non-inverting and inverting outputs.

The data from the DSP that is received in the input data register 22 is used in the digital control section made up of items 16–20. As will be discussed, the input data has particular significance to the operation of the analog input circuit (AIC).

The analog input and analog output sections may be operated synchronously or, more commonly, asynchronously. If the sections are operated asynchronously, the bandpass filter 12 and the low pass filter 28 filter clocks are independently generated from the master clock signal. Also, the D-to-A and the A-to-D conversion rates are independently determined. If the two sections are operated synchronously, the low pass filter clock 18 drives low pass filter 28 and bandpass filter 12. In synchronous operation, the A-to-D conversion timing is derived from, and is equal to the D-to-A conversion timing.

Figure 19:
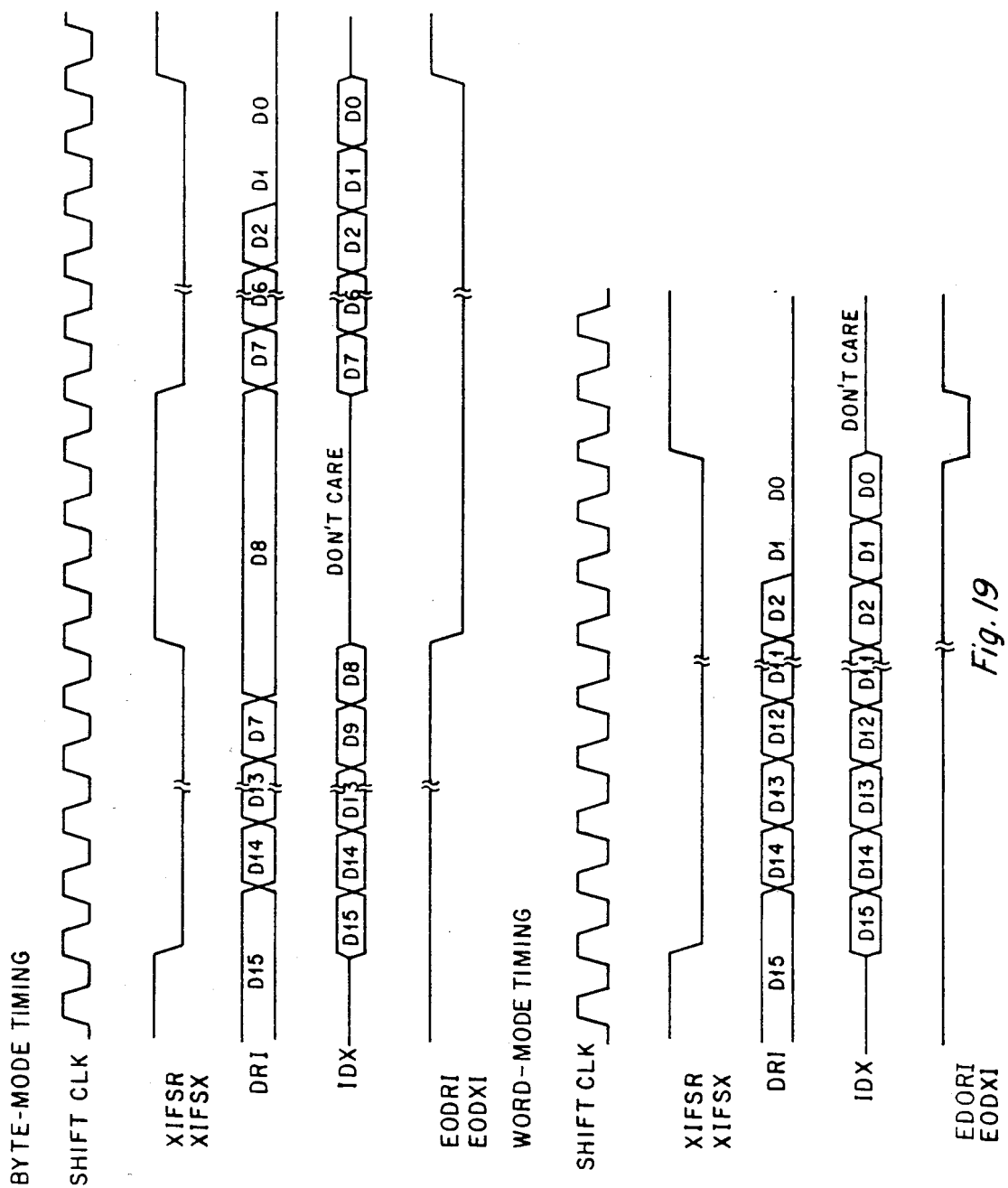
FIG. 19 illustrates conversion timing for a byte and a word.

The serial communication timing of the AIC is represented in block form in FIG. 19. Single byte timing is shown and complete word timing is shown, as determined by the user.

Signals EODRI and EODXI, during the byte-mode timing, go low after the first byte has been transmitted from AIC 19 to DSP 100 and is kept low until the second byte has been transmitted. During the word-mode timing, signals are low-going pulses that occur immediately after the 16 bits of A/D information have been transmitted from AIC 10 to DSP 100. These signals can be used to interrupt DSP 100 upon completion of serial communications.

Signal XIFSX goes low, the DSP 100 begins transmitting bits (IDX) to AIC 10.

When signal XIFSR goes low, DSP 100 begins receiving bits (DRI) from AIC 10.

As shown, the shift clock (signal ISCK) provides the basis for the timing.

Figure 18:
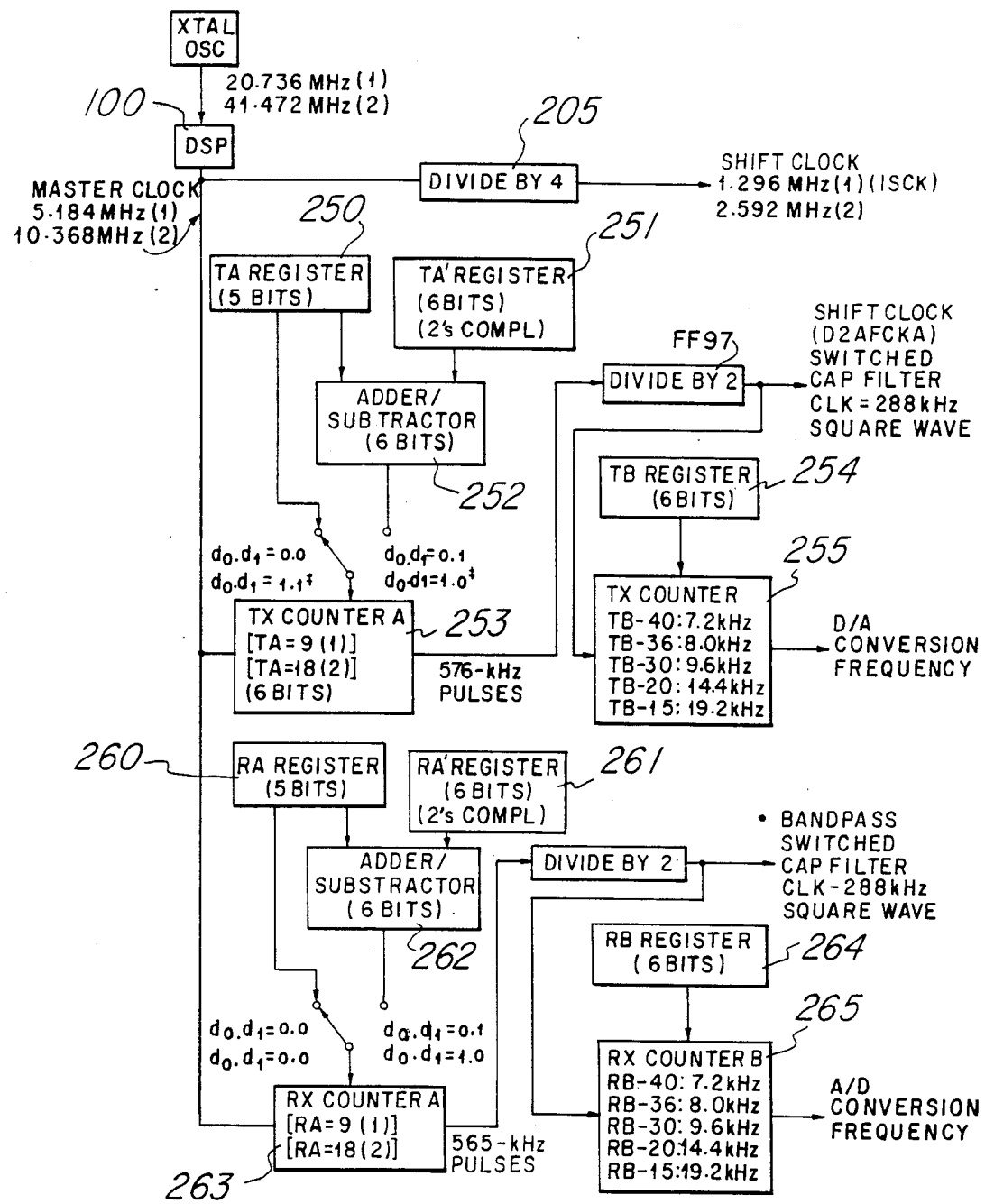
FIG. 18 is a simplified diagram illustrating the available conversion frequencies.

Referring to FIG. 18 which, in block form, details the internal timing of the AIC 10. All of the internal timing of the AIC is derived from the high frequency clock signal IMCLK. The shift clock signal ISCK is derived by dividing IMCLK by four. TX counter A 253 and TX counter B 255, which are driven by signal IMCLK, determine the D-to-A conversion timing. Similarly, RX Counter A 263 and RX Counter B 265 determine the A-to-D conversion timing. TX counter A and associated circuitry is illustrated in FIG. 13 and TX counter B and associated circuitry is illustrated in FIG. 14. RX counter A and RX counter B, although nearly identical to TX counter A and TX counter B, respectively, is not set out in detail. In this preferred embodiment, the frequency of the clock inputs of the switched-capacitor filters 12 and 28 is nominally 288K Hz which enables the switched-capacitor low pass filter 28 and the bandpass filter 12 to meet their transfer function specifications. The 288K Hz switched-capacitor clock signals (D2AFCKA) can then be divided by the contents of TX counter B 255 which has been loaded from TB register 254 with an amount determined from signals D9–D14 from input data register 22. In the same manner, RX counter B divides 288K Hz by an amount loaded from RB register 264.

TX counter A 253 and TX counter B 255 are reloaded every D-to-A conversion period, while RX counter A 263 and RX counter B 265 are reloaded every A-to-D conversion period. TX counter B 255 and RX counter 265 are loaded with the values in the TB register 254 and RB register 264, respectively. Via software control in the DSP, the TX counter A 253 can be loaded with either the contents of TA register 250, the contents of the TA register 250 less the contents of the TA' register 251, or the contents of the TA register 250 plus the contents of the TA' register 251. By selecting the contents of the TA register 250 less the contents of the TA' register 251, the upcoming conversion timing will occur earlier by an amount of time that equals the contents of the TA' register 251 times the signal period of the master clock IMCLK. By selecting the contents of the TA register 250 plus the contents of the TA' register 251, the upcoming conversion timing will occur later by an amount of time that equals the contents of TA' register 251 times the signal period of the master clock IMCLK. Thus, the D-to-A conversion timing can be advanced or retarded. An identical ability to alter the A-to-D conversion timing is provided. In this case, however, the contents of the counter A 263 can be programmed via software control with the RA register 260, the contents of the RA register 260 less the contents of the RA' register 261, or the contents of the RA register 260 plus the contents of the RA' register 261.

The ability to advance or retard conversion timing is particularly useful for modem applications. This feature allows control changes in the A-to-D and D-to-A conversion timing. This feature can be used to enhance signal-to-noise performance to perform frequency-tracking functions, and to generate non-standard modem frequencies. It is a known technology in modem applications (the DSP 100 application in this preferred embodiment) to determine phase differences between the appropriate clock rate of the DSP and the conversion rates. In this system, an inventive logic array receives the amount that the conversion timing is to be advanced or retarded and performs that operation, permitting the DSP to perform other, needed tasks. In prior art systems, as shown in the above mentioned U.S.

Pat. No. 4,638,451, the advance or retardation is limited to a single count and is completely handled by the DSP as contrasted with this inventive system where the advance or retardation is limited only by the register size. If the transmit and receive sections are configured to be synchronous, then both the low pass and bandpass switched-capacitor filter clocks are derived from TX counter A 253. Also, both the D-to-A and A-to-D conversion timing are derived from the TX counter A 253 and TX counter B 255. When the transmit and receive sections are configured to be synchronous, the RX counter A 263, RX counter B 265, RA register 260, RA' register 261 and RB register 264 are not used.

The digital word that is transmitted between the AIC 10 and the DSP 100 is comprised of bits D0–D15. The word is broken into segments, with particular functions set out by those segments. The following charts 1 and 2 illustrate those functions. The DR and DX words referred to in the charts are those that are sent to the DSP 100 and those that are sent back from the DSP 100, respectively. These two charts set out the various combinations of D0–D7 to cause the AIC 10 to perform the tasks set out.

CHART 1

A/C DR or DX word bit pattern
A/D or D/A MSB
1st bit sent — 1st bit sent of 2nd byte — A/D or D/A LBB

| D15 | D14 | D13 | D12 | D11 | D10 | D9 | D8 | D7 | D6 | D5 | D4 | D3 | D2 | D2 | D0 |

A/C DX data word format section

| d15 | d14 | d13 | d12 | d11 | d10 | d9 | d8 | d7 | d6 | d5 | d4 | d2 | d1 | d0 | COMMENTS |
|---|---|---|---|---|---|---|---|---|---|---|---|---|---|---|---|
| primary DX serial communication protocol | | | | | | | | | | | | | | | |
| ←— d15 (MSB) through d2 go to the D/A converter register 16R —→ | | | | | | | | | | | | | 0 | 0 | The TX and RX Counter A's are loaded with the TA and RA register values. The TX and RX Counter's are loaded with TB and RB register values. |
| ←— d15 (MSB) through d2 go to the D/A converter register 16R. —→ | | | | | | | | | | | | | 0 | 1 | The TX and RX Counter A's are loaded with the TA + TA' and RA + RA' register values. The TX and RX Counter B's are loaded with the TB and RB register values. NOTE: d1 = 0, d0 = 1 will cause the next D/A and A/D conversion periods to be changed by the addition of TA' and RA' Master Clock cycles in which TA' and RA' can be positive or negative or zero |
| ←— d15 (MSB) through d2 go to the D/A converter register 16R. —→ | | | | | | | | | | | | | 1 | 0 | The TX and RX Counter A's are loaded with the TA − TA' and RA − RA' register values. The TX and RX Counter B's are loaded with the TB and RB register values. NOTE: d1 = 1, d0 = 0 will cause the next D/A and A/D conversion periods to be changed by the subtraction of TA' and RA' Master Clock cycles in which TA' and RA' can be positive or negative or zero |
| ←— d15 (MSB) through d2 go to the D/A converter register 16R. —→ | | | | | | | | | | | | | 1 | 1 | The TX and RX Counter A's are loaded with the TA and RA register values. The TX and RX Counter B's are loaded with the TB and RB register values. After a delay of four Shift Clock cycles, a secondary transmission will immediately follow to program the A/C to operate in the desired configuration. |

NOTE: Setting the two least significant bits to 1 in the normal transmission of DAC information (Primary Communications) to the A/C will initiate Secondary Communications upon completion of the Primary Communications. Upon completion of the Primary Communication, $\overline{FSX}$ will remain high for four SHIFT CLOCK cycles and will then go low and initiate the Secondary Communication. The timing specifications for the Primary and Secondary Communications are identical. In this manner, the Secondary Communication, if initiated, is interleaved between successive Primary Communications. This interleaving prevents the Secondary Communication from interfering with the Primary Communications and DAC timing, thus preventing the A/C from skipping a DAC output. It is important to note that in the synchronous mode, $\overline{FSR}$ will not be asserted during Secondary Communications.

CHART 2 secondary DX serial communication protocol

| x x | ←to TA register→ | x x | ←to RA register→ | 0 0 | d13 and d6 are MSBs (unsigned binary) |
|---|---|---|---|---|---|
| x | ←to TA' register→ | x | ←to RA' register→ | 0 1 | d14 and d7 are 2's complement sign bits |
| x | ←to TB register→ | x | ←to RB register→ | 1 0 | d14 and d7 are MSBs (unsigned binary) |
| x x x x x x x x | d7 d6 d5 d4 d3 d2 ←CONTROL REGISTER→ | | | 1 1 | d2 = 0/1 deletes/inserts the bandpass filter<br>d3 = 0/1 disables/enables the loopback function<br>d4 = 0/1 disables/enables the AUX IN + and AUX IN − pins<br>d5 = 0/1 asynchronous/synchronous transmit and receive sections<br>d6 = 0/1 gain control bits<br>d7 = 0/1 gain control bits |

Signals D1 and D0 are evaluated by command generator 16P and shown in FIGS. 8A and 8B. The functions that result from the various combinations of signals D1 and D0 are shown in Chart 1. The signals that will cause those functions to occur are shown in FIG. 8B.

Note that when D1 and D0 both equal 1, the next transmission from the DSP will be a secondary transmission and will be evaluated as shown in Chart 2. The signals FSR and FSX are frame sinc signals for the receive and transmit sections, respectively. The positive sinc pulse is generally four shift clock cycles wide. during a secondary data transmission signal FSR will not be asserted.

A reset function is provided to initiate serial communications between the AIC 10 and DSP 100. The reset function will initialize all AIC registers, including control register 16R. After power has been applied to the AIC 10, a reset input will initialize the AIC registers to provide an 8K Hz A-to-D and D-to-A conversion rate for a 5.184M Hz master clock input signal. AIC 10, accepting control register 16R:

| REGISTER | INITIALIZED VALUE (HEX) |
| --- | --- |
| TA | 9 |
| TA' | 1 |
| TB | 24 |
| RA | 9 |
| RA' | 1 |
| RB | 24 |

Control register 16 R bits are reset as follows: D7 = 1, D6 = 1, D5 = 1, D4 = 0, D3 = 0, D2 = 1

This initialization allows normal serial port communications to occur between AIC 10 and DSP 100. If the transmit and receive sections are configured to operate synchronously and the user wishes to program different conversion rates, only the TA, TA', and TB registers need to be programmed, since both transmit and receive timing are synchronously derived from these registers.

When D0 and D1 are both set to 1 in the normal transmission (primary communications) from the DSP 100 to the AIC 10, then secondary communications are initiated upon completion of the primary communications. Then depending upon the states of D0 and D1, as indicated in Chart 2, bits in the secondary communication are transferred to various registers. Control bits D2-D7 are transmitted to control register 16R which then enables the various functions by generating appropriate control signals as shown. Summarizing, analog information is received by AIC 10, digitized and transmitted to DSP 100. Upon request from AIC 10, DSP 100 transmits digital information to AIC 10 which converts that digital information to analog information and transmits it to any desired receiver. If the digital information sent from DSP 100 so indicates by proper designation of the least significant bits D0 and D1, secondary information is sent in the form of a digital word from DSP 100 to AIC 10 and AIC 10 then acts upon the commands embedded in the secondary information.

It is contemplated that those skilled in the art may embody this invention in a manner different from the preferred embodiment as shown herein without departing from the spirit and scope of this invention as limited only by the appended claims.

What is claimed is:

1. An analog interface system for interfacing with a digital signal processor having an analog-to-digital converter of digitally selectable sample rate and a digital-to-analog converter of digitally selectable sample rate for converting input analog data signals and output digital data signals, respectively, a communication bus and means for detecting a sampling rate mismatch between said converters and the amplitude of said mismatch, for transmitting the mismatch amplitude on the communication bus to the analog interface system, comprising:
   (a) an analog input channel including the analog-to-digital converter, input means for receiving the input analog data signals and transmitting the input analog data signals to the analog-to-digital converter for conversion to input digital data signals, and output means connected to the communication bus for transmitting of the input digital signals to the digital signal processor;
   (b) an analog output channel including the digital-to-analog converter, input means connected to the communication bus for receiving the output digital data signals from the digital signal processor and transmitting the output digital data signals to the digital-to-analog converter for conversion into analog output signals; and
   (c) increment/decrement means connected to receive the input analog signals from the input means to indicate the amplitude of mismatch and the required direction of change of sampling rate for advancing or retarding the sampling rate of said converters in accordance with the amplitude of the mismatch.

2. The system of claim 1, further including a master clock providing master clock cycles, the amplitude of the mismatch being indicated by the number of master clock cycles between the sampling rate of the converters and the frequency of the input analog data signals.

3. The system of claim 2 wherein the increment/decrement means comprises:
   (c) (i) control generator means for initiating control signals in response to the input analog signal; and
   (ii) clock control generating means, connected to the control generator means and responsive to the control signals for advancing or retarding the converters sampling rate by the number of master clock cycles indicated.

4. The system of claim 3 wherein the control generator means comprises a register for receiving the output digital signals, and logic circuitry for initiating the control signals.

5. The system of claim 3 wherein the clock control generating means comprises:
   first register means for storing a predetermined number representative of the desired nominal converters sampling rate;
   second register means for storing the number of master clock cycles; and
   adder/subtracter means, responsive to the control signals for adding to or subtracting from the predetermined number to form a number to advance or retard the converter sampling rate.

* * * * *